(12) United States Patent
Kawabata et al.

(10) Patent No.: US 7,422,423 B2
(45) Date of Patent: Sep. 9, 2008

(54) REFRIGERANT COMPRESSOR, AND REFRIGERATING MACHINE USING THE SAME

(75) Inventors: Hirotaka Kawabata, Fujisawa (JP); Takahide Nagao, Fujisawa (JP); Akihiko Kubota, Chigasaki (JP); Hironari Akashi, Chigasaki (JP); Kosuke Tsuboi, Chigasaki (JP); Takashi Kakiuchi, Yamato (JP); Makoto Katayama, Chigasaki (JP); Takeshi Kojima, Yokohama (JP)

(73) Assignee: Matsushita Refrigeration Company, Shiga (JP)

( * ) Notice: Subject to any disclaimer, the term of this patent is extended or adjusted under 35 U.S.C. 154(b) by 547 days.

(21) Appl. No.: 10/501,658

(22) PCT Filed: Dec. 15, 2003

(86) PCT No.: PCT/JP03/16023

§ 371 (c)(1),
(2), (4) Date: Jul. 15, 2004

(87) PCT Pub. No.: WO2004/055371

PCT Pub. Date: Jul. 1, 2004

(65) Prior Publication Data

US 2005/0172646 A1     Aug. 11, 2005

(30) Foreign Application Priority Data

| Dec. 16, 2002 | (JP) | 2002-363466 |
| Dec. 19, 2002 | (JP) | 2002-367995 |
| Jun. 27, 2003 | (JP) | 2003-184186 |
| Jun. 27, 2003 | (JP) | 2003-184187 |
| Jul. 4, 2003 | (JP) | 2003-191963 |
| Oct. 15, 2003 | (JP) | 2003-354863 |
| Oct. 22, 2003 | (JP) | 2003-361719 |
| Oct. 22, 2003 | (JP) | 2003-361720 |
| Nov. 7, 2003 | (JP) | 2003-378286 |

(51) Int. Cl.
*F04B 35/04* (2006.01)
*C09K 5/04* (2006.01)
*F25B 49/02* (2006.01)

(52) U.S. Cl. .......... 417/410.1; 417/902; 62/114; 62/468; 62/498

(58) Field of Classification Search ........ 417/410.1; 62/114, 468, 498
See application file for complete search history.

(56) References Cited

U.S. PATENT DOCUMENTS 6,439,857 B1 * 8/2002 Koelzer et al. ......... 417/222.1

(Continued)

FOREIGN PATENT DOCUMENTS

JP      03-35275 U      4/1991

(Continued)

OTHER PUBLICATIONS

Japanese International Search Report for PCT/JP03/16023, dated Feb. 3, 2004.

*Primary Examiner*—Devon Kramer
*Assistant Examiner*—Patrick Hamo
(74) *Attorney, Agent, or Firm*—RatnerPrestia

(57) ABSTRACT

A refrigerant compressor includes a compressor section, driver, a first contact section and a second contact section. The compressor section is accommodated in a closed container for compressing refrigerant gas. The driver drives the compressor section. The first and second contact sections are brought into contact with each other or they slide with each other by driving the compressor section. On the surface of each one of the contact sections, at least one of plural recesses uniformly placed or a mixed layer, to which molybdenum disulfide ($MoS_2$) is bound, is formed. The foregoing structure allows increasing the abrasion resistance of the first and second contact sections.

28 Claims, 26 Drawing Sheets

U.S. PATENT DOCUMENTS

| | | |
|---|---|---|
| 6,477,938 B1 * | 11/2002 | Nakayama et al. .............. 92/71 |
| 2002/0061254 A1 * | 5/2002 | Morita et al. ................ 417/417 |
| 2002/0159893 A1 * | 10/2002 | Sugiura et al. ........... 417/222.1 |
| 2003/0000383 A1 | 1/2003 | Ogihara et al. |

FOREIGN PATENT DOCUMENTS

| | | |
|---|---|---|
| JP | 03-112586 | 11/1991 |
| JP | 06-081766 | 3/1994 |
| JP | 06-117371 | 4/1994 |
| JP | 08-121361 | 5/1996 |
| JP | 09-032730 A | 2/1997 |
| JP | 09-112469 | 5/1997 |
| JP | 11-201166 A | 7/1999 |
| JP | 2000-097153 A | 4/2000 |
| JP | 2000-110719 A | 4/2000 |
| JP | 2000-161228 A | 6/2000 |
| JP | 2000-227083 A | 8/2000 |
| JP | 2000-257560 A | 9/2000 |
| JP | 2000-291549 A | 10/2000 |
| JP | 2002-021727 A | 1/2002 |
| JP | 2002-106981 A | 4/2002 |
| JP | 2002-195160 A | 7/2002 |
| JP | 2002-213612 A | 7/2002 |
| JP | 2002-310157 A | 10/2002 |
| WO | WO 97/28379 A1 | 8/1997 |
| WO | WO 02/40743 A1 | 5/2002 |

* cited by examiner reciprocating motion a flow of oil sliding direction rotary motion rocking motion rotary motion rotary motion reciprocating motion reciprocating motion a flow of oil sliding direction friction coefficient (-)

manganese phosphate process | MoS₂ layer | MoS₂ layer with spherical recesses volume worn-out (mm³)

manganese phosphate process | MoS₂ layer with spherical recesses reciprocating motion reciprocating motion rotary motion rotary motion reciprocating motion reciprocating motion reciprocating motion

PRIOR ART

PRIOR ART

REFRIGERANT COMPRESSOR, AND REFRIGERATING MACHINE USING THE SAME

This Application is a U.S. National Phase Application of PCT International Application PCT/JP2003/016023.

TECHNICAL FIELD

The present invention relates to refrigerant compressors to be used in refrigerators and air-conditioners, and refrigerating machines using the same refrigerant compressor.

BACKGROUND ART

A recent glowing tendency in the global environment protection has urged the industry to develop efficient compressors consuming less fossil fuel.

FIG. 58 shows a sectional view of a conventional electrical enclosed refrigerant-compressor. FIG. 59 illustrates a supporting structure for the compressor. Closed container (hereinafter referred to simply as "container") 1 pools oil 2 at the bottom, and accommodates motor section 5 having stator 3 and rotor 4, as well as compressor section 6 driven by motor section 5. Compressor unit 7 having motor section 5 and compressor section 6 is resiliently supported by compression spring (hereinafter referred to simply as "spring") 8 in container 1.

Crankshaft 9 has main shaft 9A, to which rotor 4 is fixed, and eccentric section 9B formed eccentrically with respect to main shaft 9A. Lubricating pump 10 is prepared to crankshaft 9. Main shaft 9A is supported by bearing 23. Cylinder block 11 has compressing room 13 including typically cylindrical bore 12. Piston 14 goes back and forth in bore 12, and is coupled to eccentric section 9B with a sliding mechanism. An end face of bore 12 is sealed by valve plate 15.

Head 16 forms a high-pressure room. Discharging path 17, which guides compressed refrigerant gas from head 16 to outside container 1, is coupled via pipe 18 to a high pressure side (not shown) of a refrigerating cycle disposed outside container 1. Pipe 18 is made of polymer material of heat resistance, refrigerant resistance, and oil resistance. Pipe 18 prevents discharging path 17 from resonating.

Holder 20 made of synthetic resin is mounted to a head of each one of bolts 19 which fasten the stator of motor section 5. Another holder 22 made of synthetic resin is mounted to each one of projections 21 provided on the inner wall of container 1. Springs 8 are placed surrounding holders 20 and 22.

An operation of the foregoing refrigerant compressor is demonstrated hereinafter. Commercial power is supplied to motor section 5 and rotates rotor 4, which spins crankshaft 9, so that eccentric section 9B eccentrically moves to drive piston 14. The reciprocation of piston 14 in bore 12 puts refrigerant gas guided into container 1 into compressor room 13 via a suction valve (not shown). The refrigerant gas is then continuously compressed, and transferred outside container 1 via a discharging valve (not shown), discharging path 17, and pipe 18.

The rotation of crankshaft 9 prompts lubricating pump 10 to supply oil 2 to respective sliding sections for lubricating the sliding sections, and oil 2 is discharged from a tip of eccentric section 9B into container 1. Oil 2 also works as seal between piston 14 and bore 12.

Main shaft 9A of crankshaft 9 and bearing 23 form a sliding section with each other as well as piston 14 and bore 12. In the conventional compressor, a first member of the sliding section is made of nitrided iron-based material undergone manganese phosphate process, and a second member thereof is made of aluminum die-cast undergone anodizing. Those techniques are disclosed in, e.g. Japanese Patent Application Non-Examined Publication No. H06-117371.

However, if the sliding sections are processed by manganese phosphate which has a low hardness, the manganese-phosphate layer tends to wear away when metallic contact occurs on the sliding section at the operation start because oil film does not yet cover the sliding section. Then the friction coefficient becomes higher, and sliding loss possibly increases. A smaller clearance between the sliding sections for decreasing the friction coefficient will produce metallic contact, which wears the manganese-phosphate layer away, so that friction increases or abnormal friction possibly occurs. Further, between piston 14 and bore 12, piston 14 wears much, so that the space in between becomes greater. As a result, compressed refrigerant gas may leak from the space between piston 14 and bore 12, thereby lowering the efficiency.

On top of that, use of the oil of low viscosity for lowering the viscous resistance will reveal the foregoing problems more expressly.

Another prior art discloses a compressor of which sliding sections are applied with molybdenum disulfide ($MoS_2$), as solid lubricant on their surfaces. Such a compressor is disclosed, e.g. Japanese Patent Application Non-Examined Publication Nos. H08-121361 and H09-112469.

$MoS_2$ includes a binder of polyamide-imidic resin (PAI) because it is applied to the sliding sections; however, PAI has a higher friction coefficient than $MoS_2$, so that the sliding loss increases. In the case of using metal such as iron or aluminum as base material of the sliding sections, those metals have binding force to the PAI (binder) weaker than those of ordinal metallic bonds. At the sliding section on which $MoS_2$ is applied, peeling occurs on the interface between the base material and the binder. As a result, $MoS_2$ cannot exert its advantage of increasing abrasion resistance, and yet, an amount of abrasive wear sometimes increases.

The linear movement of piston 14 excites compressor section 6, and this excitation always causes micro-vibration at spring 8 during the rotation of compressor unit 7. At the operation start or stop, compressor section 6 largely wobbles due to inertia force, and then spring 8 also wobbles, so that spring 8 contacts holders 20, 22 intermittently, and they scrape against each other. At this time, holders 20, 22 absorb the scraping noise since they are made from synthetic resin. Those techniques about compressors are disclosed in Japanese Patent Application Non-Examined Publication No. H06-81766.

The foregoing structure, however, needs holders 20, 22 separately because they are made from synthetic resin, so that the number of components and the manufacturing cost increase.

Since compressor section 6 largely wobbles at the operation start and stop, discharging path 22 also largely wobbles, so that path 22 contacts pipe 23 intermittently, and they scrape against each other. The scraping noise is absorbed by pipe 23 because it is made of polymeric material. However, this material is expensive because of its heat resistance, refrigerant resistance, and oil resistance.

In the compressor, the valves (not shown) for sucking and discharging the refrigerant gas between compressing room 13 and container 1 operate following the drive of compressor section 6. Then the valve port contacts the valve seat, thereby producing noises.

As such, the drive of compressor section 6 entails various sections to contact with each other or scrape against each other, so that the abrasive wear lowers the performance or produces noises. For overcoming the foregoing problems, the prior art requires additional components or expensive materials.

DISCLOSURE OF THE INVENTION

The refrigerant compressor of the present invention has a compressor section, a driver, a first contact section and a second contact section. The compressor section is accommodated in a closed container for compressing the refrigerant gas. The driver drives the compressor section. The first and second contact sections contact with each other or slide against each other due to the drive of the compressor section. On the surfaces of the contact sections, at least one of recesses uniformly placed or a mixed layer, to which $MoS_2$ is bound, is formed.

DETAILED DESCRIPTION OF PREFERRED EMBODIMENTS

Exemplary embodiments of the present invention are demonstrated hereinafter with reference to the accompanying drawings. In respective embodiments, elements similar to those of a previous embodiment have the same reference marks, and the detailed descriptions thereof are omitted.

Exemplary Embodiment 1

Figure 1:
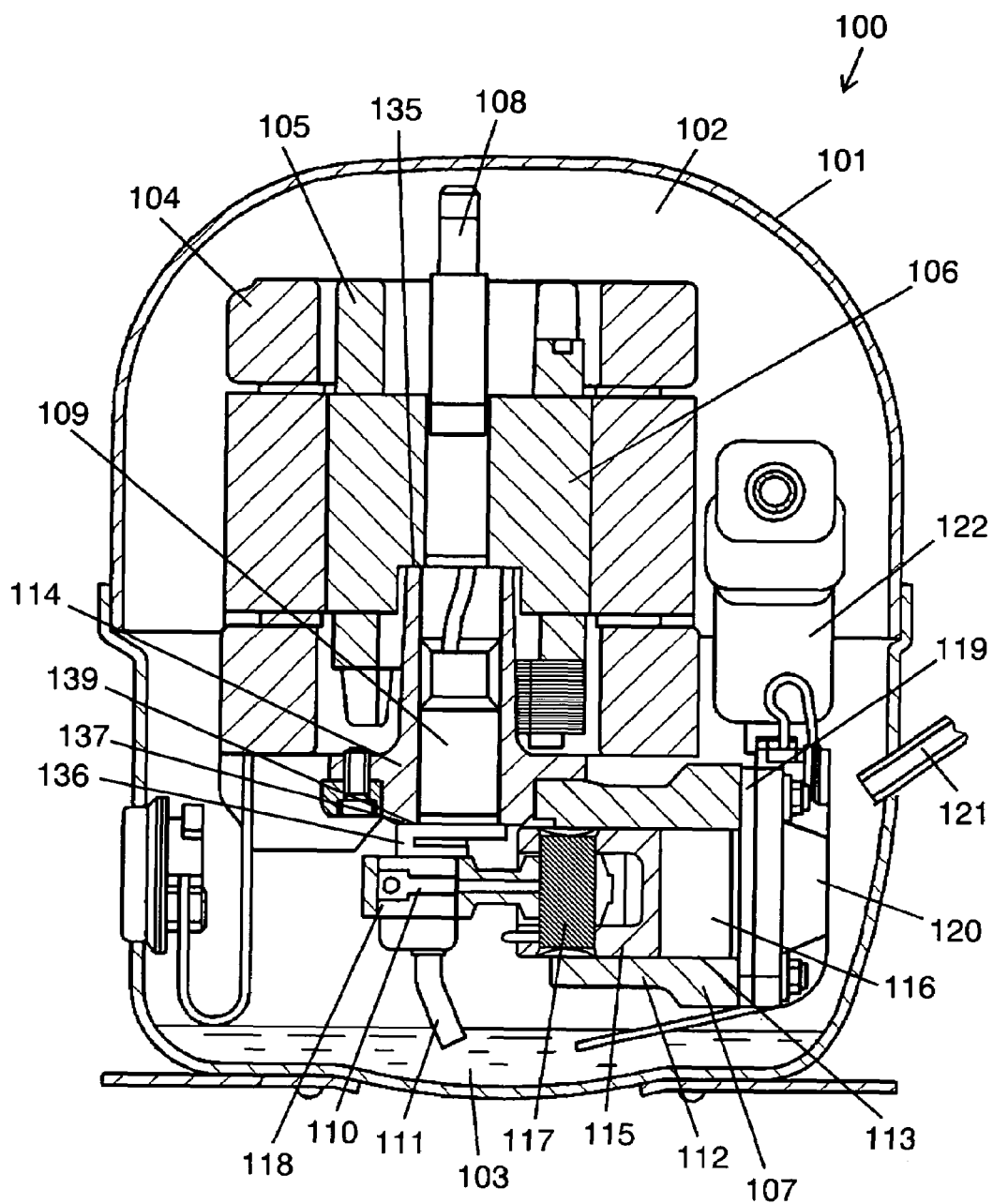
FIG. 1 shows a sectional view of a refrigerant compressor in accordance with an exemplary embodiment of the present invention.
Figure 2:
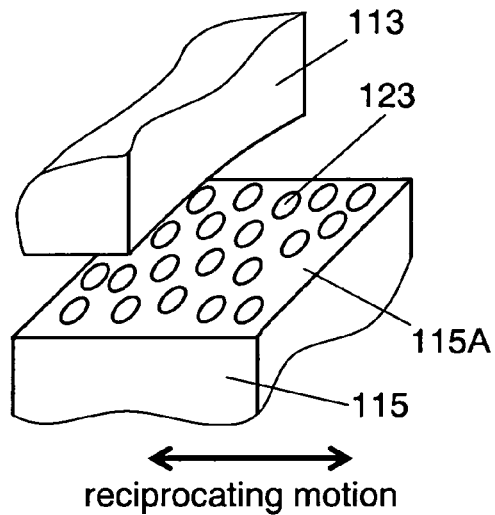
FIG. 2 shows an enlarged view of a sliding section formed by a piston and a bore shown in FIG. 1.
Figure 3:
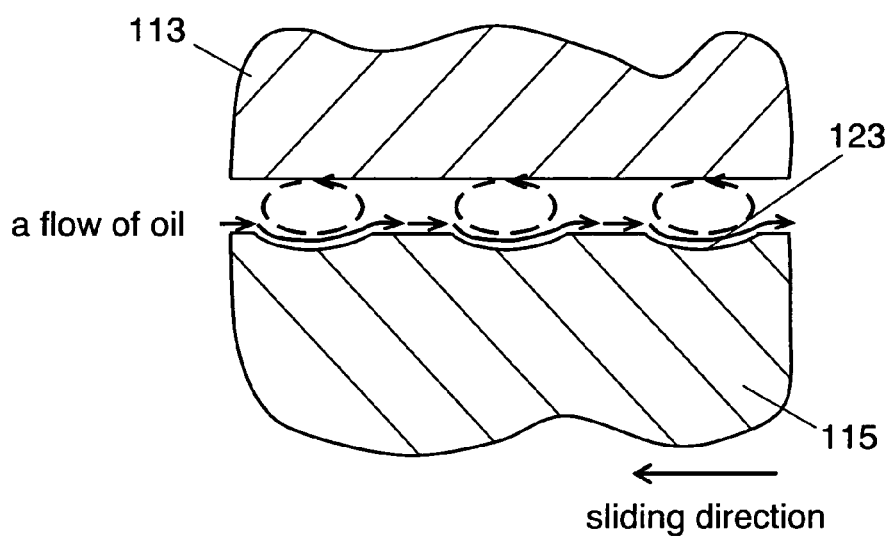
FIG. 3 illustrates a flow of oil when the piston slides along the bore shown in FIG. 1.
Figure 4:
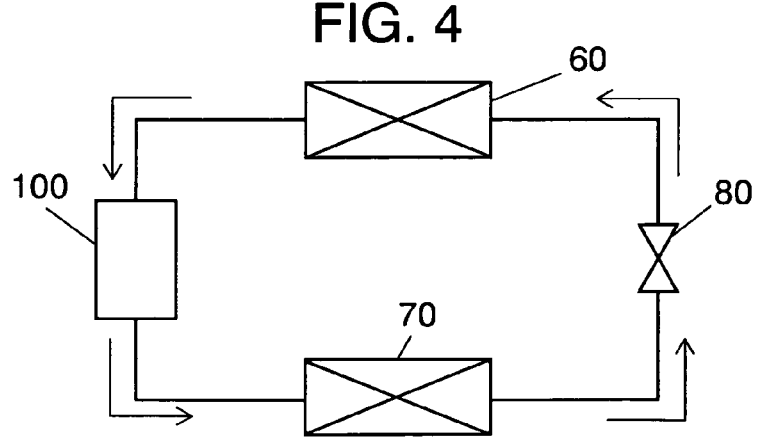
FIG. 4 shows a refrigerating cycle of a refrigerating machine which includes the compressor shown in FIG. 1.
Figure 5:
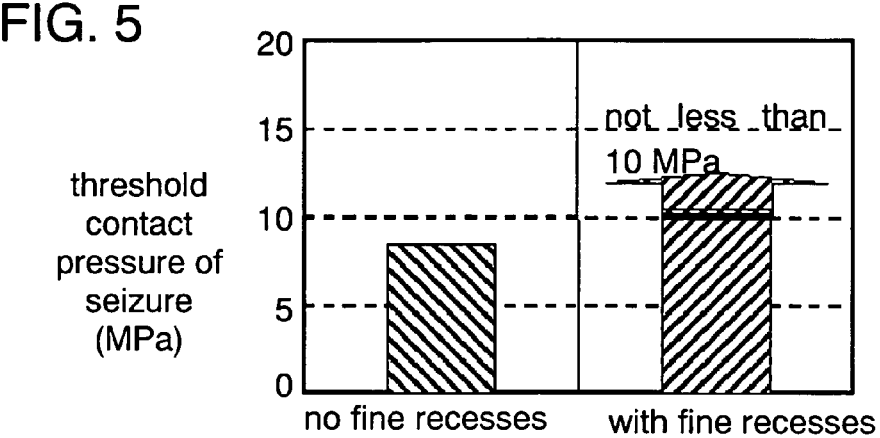
FIG. 5 shows locked pressures in accordance with the exemplary embodiment of the present invention.
Figure 6:
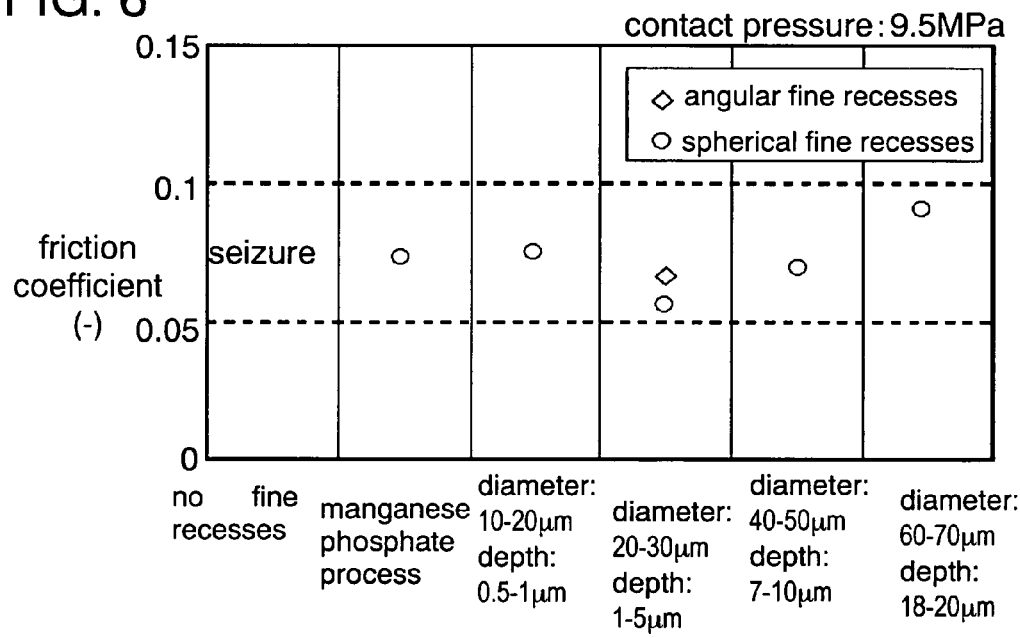
FIG. 6 shows friction coefficients in accordance with the exemplary embodiment of the present invention.
Figure 7:
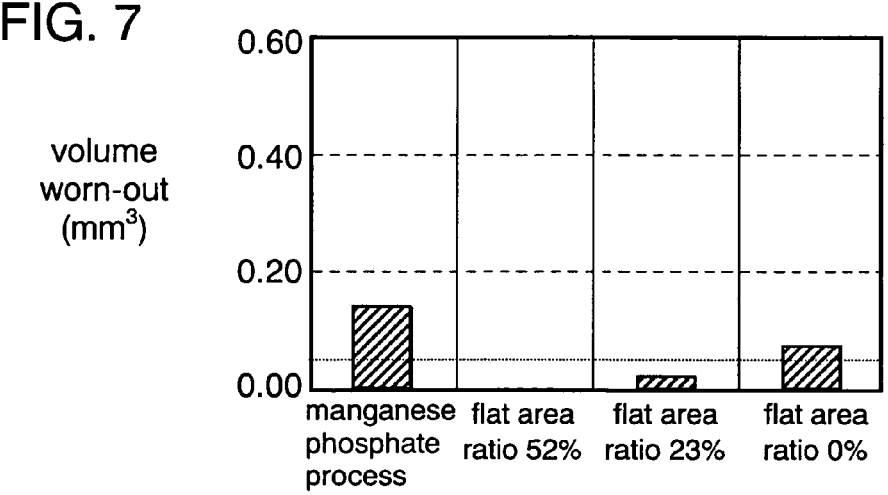
FIG. 7 shows amounts of abrasive wear in accordance with the exemplary embodiment of the present invention.

FIG. 1 shows a sectional view of compressor 100 in accordance with a first exemplary embodiment of the present invention. FIG. 2 shows an enlarged view of a sliding section formed by a piston and a bore shown in FIG. 1. FIG. 3 shows a flow of oil at the sliding section of the piston and the bore. FIG. 4 shows a refrigerating cycle of a refrigerating machine that includes compressor 100. FIG. 5 shows locked pressures in a state of having fine recesses or no fine recesses. FIG. 6 shows characteristics of friction coefficients depending on the shape and size of the fine recesses. FIG. 7 shows characteristics of amounts of abrasive wear depending on areas of the fine recesses on the surface of the sliding section.

In FIG. 1-FIG. 3, closed container (hereinafter referred to simply as "container") 101 is filled with refrigerant gas 102 made of isobutane. Container 101 pools oil 103, accommodates motor section 106 having stator 104 and rotor 105 as well as reciprocating compressor section 107 driven by motor section 106. Motor section 106 works as a driver, and if compressor section 107 is disposed in container 101 airtightly, motor section 106 can be prepared outside container 101.

Next, compressor section 107 is detailed. Crankshaft 108 has main shaft 109, to which rotor 105 is press-fitted, and eccentric section 110 eccentric with respect to main shaft 109. Crankshaft 108 has lubricating pump 111 at its lower end, and pump 111 communicates with oil 103. Cylinder block 112 made from cast-iron forms typically cylindrical bore 113 and bearing 114 which rotatably supports main shaft 109.

Piston 115 reciprocating in bore 113 is made from iron-based material and forms compressing room 116 together with bore 113. Piston 115 is coupled to eccentric section 110 with connecting rod 118 via piston-pin 117. An end face of bore 113 is sealed by valve plate 119.

Head 120 forms a high-pressure room and is fixed on valve plate 119 at the opposite side to bore 113. Suction tube 121 is fixed to container 101, and coupled to heat-exchanger 60 at the lower pressure side of the refrigerating cycle for guiding refrigerant gas 102 into container 101. Suction muffler 122 is sandwiched by valve plate 119 and head 120, which discharges compressed refrigerant 102 to heat exchanger 70, where refrigerant 102 dissipates the heat. Then refrigerant 102 returns to heat exchanger 60 via expansion valve 80 and collects heat. The refrigerating machine is thus structured.

Sliding sections are formed between the following elements respectively: main shaft 109 and bearing 114; piston 115 and bore 113; piston pin 117 and connecting rod 118; eccentric section 110 and connecting rod 118. Those elements forming the sliding sections are contact sections that slide against each other due to driving compressor section 107.

On sliding face 115A of piston 115, fine recesses 123 are formed almost uniformly. Each one of recesses 123 is shaped like a sphere, and preferably has a diameter of 20-50 μm, depth of 1-10 μm. The area of recesses 123 more preferably accounts for 40-80% of the surface area of sliding face 115A. In the case of using iron-based material for the elements discussed above, the sliding faces thereof have preferably undergone martensitic process.

Recesses 123 can be formed by etching or press-molding the surface. In this embodiment, hard micro-balls having a high hardness such as steel balls or ceramic balls crash to the surface at a speed higher than a given one, thereby forming recesses 123. For instance, in the case of increasing the hardness of the cast iron by work-hardening, ceramic micro-balls or steel micro-balls, having 2-50 μm diameter and a hardness higher than that of the subject item, are accelerated and injected from a projector, such that the balls have a speed of 20 sec/min, against the surface of the cast iron. The collision at a high speed against the subject item, as discussed above, provides the surface of the subject item with residual compressing stress, thereby increasing the hardness up to about 600 Hv in terms of Vickers hardness.

An operation of compressor 100 thus structured is demonstrated hereinafter.

Commercial power is supplied to motor section 106, thereby spinning rotor 105 of motor section 106. Rotor 105 rotates crankshaft 108, and eccentric movement of eccentric section 110 drives piston 115 via connecting rod 118 and piston pin 117. Piston 115 thus reciprocates in bore 113.

Refrigerant gas 102 guided through suction tube 121 into container 101 is sucked from suction muffler 122 and compressed continuously in compressing room 116.

The rotation of crankshaft 108 supplies oil 103 from pump 111 to respective sliding sections for lubricating each one of the sliding sections and also for sealing between piston 115 and bore 113.

When the reciprocation of piston 115 in bore 113 compresses refrigerant gas 102, parts of compressed gas 102 leak into container 101 via a space between piston 115 and bore 113, thereby lowering the volumetric efficiency. However, in this embodiment, the gas leaking to the space between piston 115 and bore 113 reaches recesses 123, so that the volume of the space between piston 115 and bore 113 increases. Recesses 123 therefore work like the labyrinth seal, and the flow speed of the gas leaking lowers sharply. As a result, the volumetric efficiency of compressor 100 increases, and the compression efficiency of compressor 100 increases.

Next, the measurement of the locked pressure is described with reference to FIG. 5. The contact pressure is measured on the face having the fine recesses and the face having no fine recesses in the following conditions:
atmospheric pressure in $CH_2FCF_3$ refrigerant; 0.4 MPa,
ester oil viscosity; VG8-VG10 of ISO viscosity grade, and
sliding speed; 1.0 m/sec As FIG. 5 clearly tells, piston 115 having recesses 123 shows a substantially better locked pressure than the piston having no recesses 123. The formation of recesses 123 almost uniformly on the sliding face allows recesses 123 to retain oil 103 supplied. When the space between the sliding sections becomes smaller along the sliding direction, oil 103 is drawn into the smaller space due to the viscosity of oil 103 and the relative movement of the respective sliding sections. This mechanism produces a pressure in oil 103 for supporting a load, so that wedge-shaped oil film is formed. This oil film prevents the metal contact from happening between the sliding sections, so that a higher locked load can be expected.

The friction coefficient is measured using the shape and size of recesses 123 as parameters in the following condition:
atmospheric pressure in $CH_2FCF_3$ refrigerant; 0.4 MPa,
ester oil viscosity; VG8-VG10,
sliding speed; 1.0 m/sec, and
contact pressure; 0.5 MPa The result tells that piston 115 with spherical recesses 123 has the friction coefficient lower than that with angular recesses. Because the spherical recess has a greater volume than the polygonal pyramid which has the same projected area as the spherical recess, so that the oil pressure of the wedge-shaped oil film increases. In other words, as shown in FIG. 3, the spherical recess allows the flowing oil, which produces the oil film when the sliding sections slide with each other, to form a vortex flow with ease in the recess, thereby producing oil pressure which prevents the metal contact.

The spherical shape allows the space between the sliding sections to stay unchanged regardless of the sliding directions, so that the oil film can be formed uniformly overall the sliding sections. A deviation of the space between piston 115 and bore 113 thus becomes smaller, and refrigerant gas 102 leaks in less amount along the side face of piston 115.

Further, when recess 123 has a diameter of 20-30 μm and a depth of 1-5 μm, the friction coefficient becomes minimum. If this dimension is somewhat enlarged to a diameter of 20-50 μm and a depth of 1-10 μm, the friction coefficient is still lower than that in the case of manganese phosphate process, and the better sliding condition can be expected.

As the atmospheric pressure lowers, the amount of refrigerant 102 dissolving into oil 103 decreases. Comparing with a recess of 50 μm across and a depth of greater than 10 μm, the recess having a diameter of 20 μm-50 μm and having a depth of 1-10 μm, i.e. having a smaller volume, invites less decrease of the atmospheric pressure. The pressure of compressed refrigerant gas 102 is thus kept at a high level, so that the amount of decrease of refrigerant solvable into oil 103 can be suppressed. This mechanism reduces foaming phenomenon of the refrigerant in oil 103. Because this foaming phenomenon breaks the oil film formed on the sliding sections and the breakage invites the metal contact, the reduction of foaming thus prevents the metal contact. The rise of friction coefficient is thus prevented.

The volumes of abrasive wear shown in FIG. 7 also tell the prevention of the friction coefficient from rising. The abrasion volumes are measured in the following conditions:
atmospheric pressure in $CH_2FCF_3$ refrigerant; 0.4 MPa,
ester oil viscosity; VG8-VG10,
sliding speed; 1.0 m/sec, and
contact pressure; 0.5 MPa.

FIG. 7 shows relations between the abrasion volume vs. ratio of the area of a flat area, other than recesses 123 in the surface area of the sliding section. In other words, as the flat area ratio becomes smaller, recesses 123 account for greater area.

This result proves that the formation of recesses 123 on the surface of sliding sections produces an abrasion amount less than the surface thereof undergone the manganese phosphate process. In the case of a flat area ratio accounting for 52%, an abrasion amount becomes 0 $mm^3$. However, increment of the ratio of the recesses on the sliding surface area increases the abrasion amount. Further study in detail of this matter finds the following result: in the case of a flat area ratio ranging from 20% to 60%, in other words, the recessed area ratio vs. the surface area of the moving parts ranging from 40% to 80%, the abrasion amount falls within less than 0.05 $mm^3$, shown in FIG. 7 with a dotted line, this abrasive amount does not cause any problem in actual use.

Within such a range, it is thought that a slanting surface section and a flat face section are formed on the sliding section. Recesses 123 form wedge-shaped oil film on the slanting surface section in the sliding direction, and the flat face section is formed in parallel with the sliding face. It is thought that those formations produce a shape and effect similar to those of the taper land bearing, so that the critical load supportable by the oil pressure generated increases. As a result, the metal contacts are reduced.

In the case of using iron-based material in the sliding section, steel balls or ceramic balls crash to the surface at a speed greater than a given speed for forming recesses 123 on the surface of the sliding section. This method makes the surface layer of the sliding section martensitic, so that the surface strength increases, and the abrasion progress becomes slower. And the area between sliding sections decreases due to forming recesses 123, so that the metal contacts are reduced.

In this embodiment, as discussed above, recesses 123 are provided almost uniformly on the sliding face of piston 115. Recesses 123 can be provided on bore 113 or both of piston 115 and bore 113 with a similar advantage.

Figure 8:
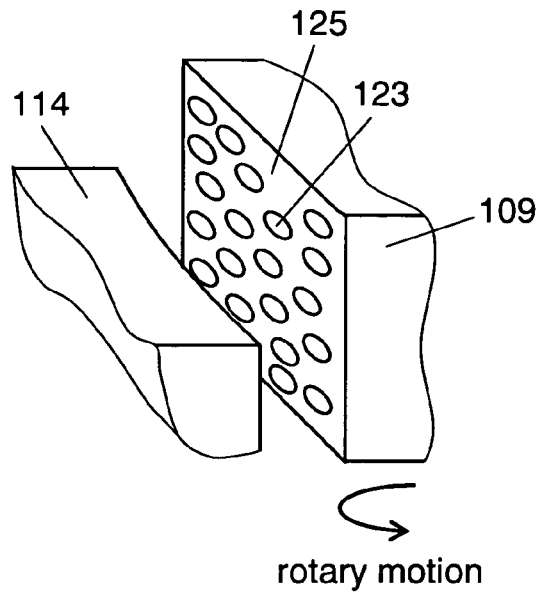
FIG. 8 shows an enlarged view of a sliding section formed by a main shaft and a bearing shown in FIG. 1.

Next, the sliding section formed by main shaft 109 and bearing 114 is described. FIG. 8 shows an enlarged view of the sliding section formed by main shaft 109 and bearing 114.

Main shaft 109 of crankshaft 108 has recesses 123 on its sliding face 125 almost uniformly.

An operation of compressor 100 structured above is demonstrated hereinafter.

Main shaft 109 of crankshaft 108 having recesses 123 on its sliding face 125 rotates in bearing 114, then lubricating pump 111 supplies oil 103, which includes the refrigerant, to a sliding section between bearing 114 and crankshaft 108. On the other hand, while crankshaft 108 rotates in bearing 114 one turn, the space between main shaft 109 and bearing 114 changes in response to a depth of recesses 123. At this time, oil 103 is drawn into the space between main shaft 109 and bearing 114, thereby forming wedge-shaped oil film.

Since recesses 123 are minutely formed, when oil 103 in which the refrigerant is solved is supplied to recesses 123, the volume changes in recess 123 only a little and the atmospheric pressure lowers a little. Thus the pressure of compressed refrigerant gas 102 can be kept at a high level, so that decrease of a solvable amount of the refrigerant in oil 103 can be suppressed. The foaming phenomenon of the refrigerant in oil 103 is thus suppressed. Because this foaming phenomenon breaks the oil film formed on the sliding sections and the breakage invites the metal contact, the suppression of the foaming phenomenon thus prevents the metal contact, and the rise of friction coefficient is prevented.

At the operation start of compressor 100, the sliding sections are not yet lubricated; however, since oil 103 is pooled in recesses 123, oil 103 always exists between bearing 114 and main shaft 109. As a result, the locked load rises and abnormal abrasion is prevented.

As discussed above, in this embodiment, main shaft 109 of crankshaft 108 has recesses 123 almost uniformly formed on its sliding section. The formation of recesses 123 reduces the slid area, so that the metal contacts are reduced. Recesses 123 can be provided to bearing 114, or to both of main shaft 109 and bearing 114 with a similar advantage.

Figure 9:
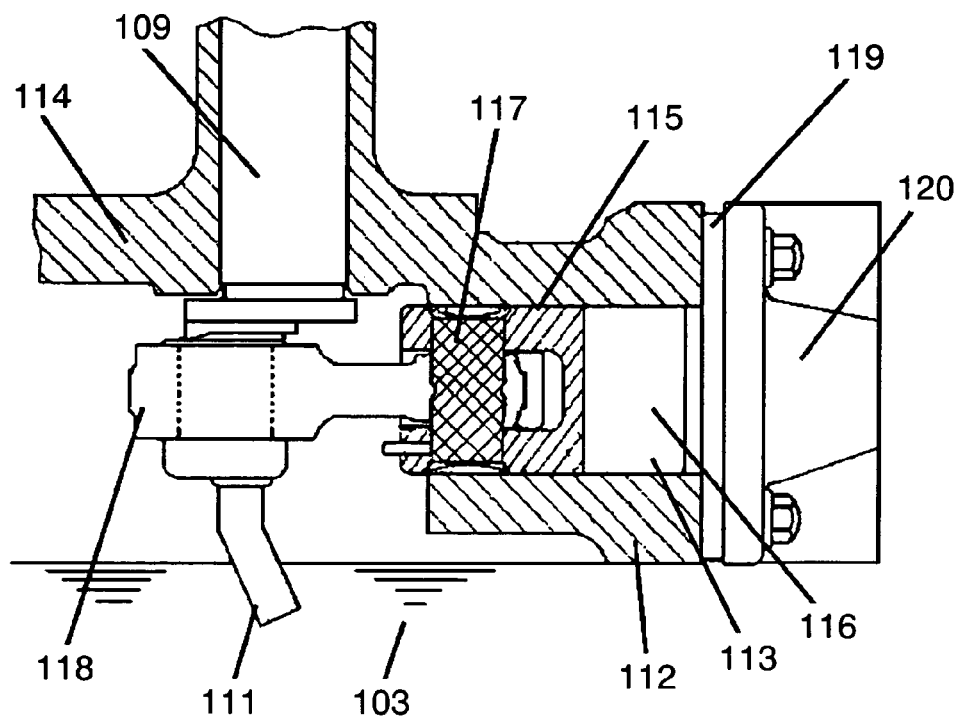
FIG. 9 shows an enlarged view of the vicinity of the piston shown in FIG. 1.
Figure 10:
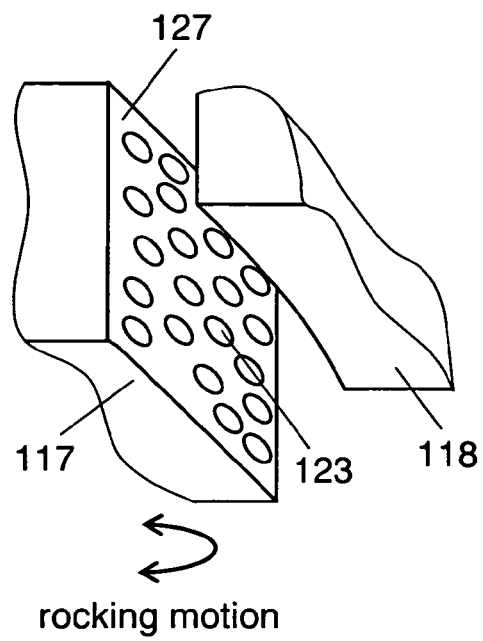
FIG. 10 shows an enlarged view of a sliding section formed by the piston and a connecting rod shown in FIG. 9.

Next, the sliding section formed by connecting rod 118 and piston-pin 117 is described. FIG. 9 shows an enlarged view of a vicinity of the piston shown in FIG. 1. FIG. 10 shows an enlarged view of the sliding section formed by piston-pin 117 and connecting rod 118.

Piston-pin 117 has recesses 123 almost uniformly on its sliding face 127. The formation of recesses 123 reduces the slid area of the sliding section, so that the metal contacts are reduced.

An operation of compressor 100 structured above is demonstrated hereinafter. Rotary motion of crankshaft 108 is transferred via piston-pin 117 coupled to connecting rod 118, thereby reciprocating piston 115 in bore 113. At this time, rod 118 and piston-pin 117 perform rocking motion, and when piston 115 reaches its upper dead center or bottom dead center, the speed of the rocking motion becomes 0 m/sec (zero), and the oil film cannot be formed. At this time, oil 103 is retained each one of recesses 123 formed on sliding face 127 of piston-pin 117, so that oil 103 always exists between the sliding sections. As a result, the locked load rises and abnormal abrasion is prevented.

As discussed above, in this embodiment, piston-pin 117 has recesses 123 almost uniformly on its sliding face 127. Recesses 123 can be formed on connecting rod 118, or both on pin 117 and rod 118 with a similar advantage.

Figure 11:
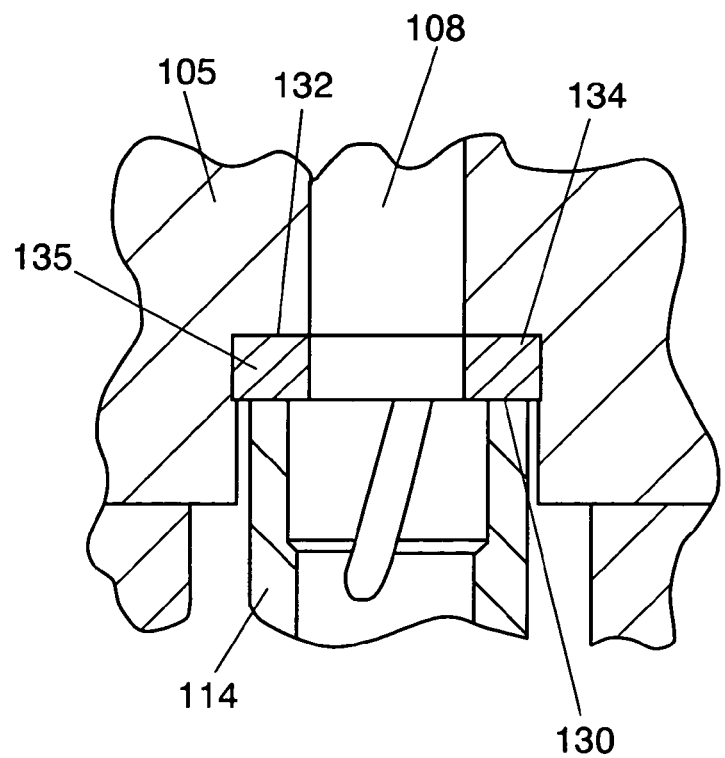
FIG. 11 shows an enlarged view of the vicinity of a thrust bearing shown in FIG. 1.
Figure 12:
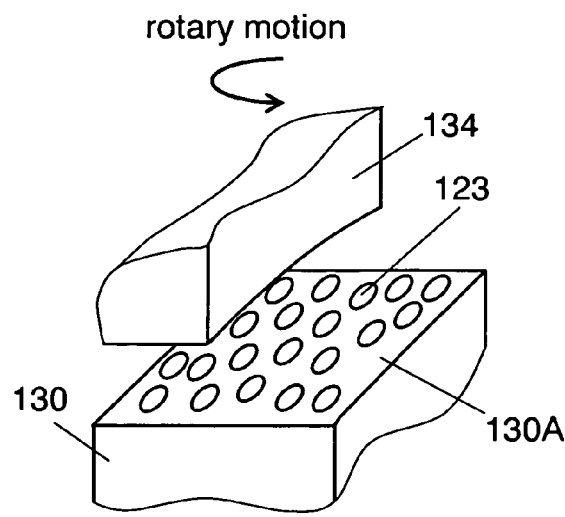
FIG. 12 shows an enlarged view of a sliding section formed by a thrust section and a thrust washer shown in FIG. 11.

Next, the sliding section formed on thrust bearing 135 is described. FIG. 11 shows an enlarged view of the vicinity of thrust bearing 135 shown in FIG. 1. FIG. 12 shows an enlarged view of the contact section between thrust section 130 and thrust washer 134.

Thrust section 130 has recesses 123 almost uniformly on its sliding face 130A.

An operation of compressor 100 structured above is demonstrated hereinafter.

Rotor 105 is press-fitted to crankshaft 108 and has flange face 132, and the upper end of bearing 114 forms thrust section 130. Thrust washer 134 is inserted between flange face 132 and thrust section 130, so that flange face 132, thrust section 130 and thrust washer 134 form thrust bearing 135, which bears vertical load of crankshaft 108 and rotor 105 and so on. While compressor 100 is halted, thrust bearing 135 receives the vertical load.

Formation of recesses 123 on sliding face 130A of thrust section 130 allows recesses 123 to retain oil 103 even at the start of operation of compressor 100, namely, lubrication is not carried out yet at the start. This oil retention lowers the friction coefficient of the sliding section and reduces the sliding loss when metal contacts occur between thrust section 130 and thrust washer 134. Further, since recesses 123 retain oil 103, the sliding section always has oil 103, so that the locked load rises to prevent abnormal abrasion. The formation of recesses 123 reduces the slid area between the sliding sections, so that the metal contacts are also reduced.

As discussed above, in this embodiment, thrust bearing 135 is formed of flange face 132, thrust section 130 and thrust washer 134, and recesses 123 are formed on sliding face 130A. Flange face 136 working as thrust section 137 also exists between main shaft 109 and eccentric section 110 of crankshaft 108. Flange face 136 and thrust section 139, which confronts flange face 136, of bearing 114 can form a thrust bearing. In this case, recesses 123 are provided to thrust section 137 to obtain a similar advantage.

In this embodiment, recesses 123 are provided almost uniformly on sliding face 130A of thrust section 130 of bearing 114; however, they can be provided to thrust washer 134, or to both of washer 134 and thrust section 130 with a similar advantage. Recesses 123 can be also provided on a face of rotor 105 contacting the flange face. Recesses 123 can be provided to thrust section 137 of crankshaft 108, or to both of thrust section 137 of crankshaft 108 and thrust section 139 of bearing 114 with a similar advantage.

Figure 13:
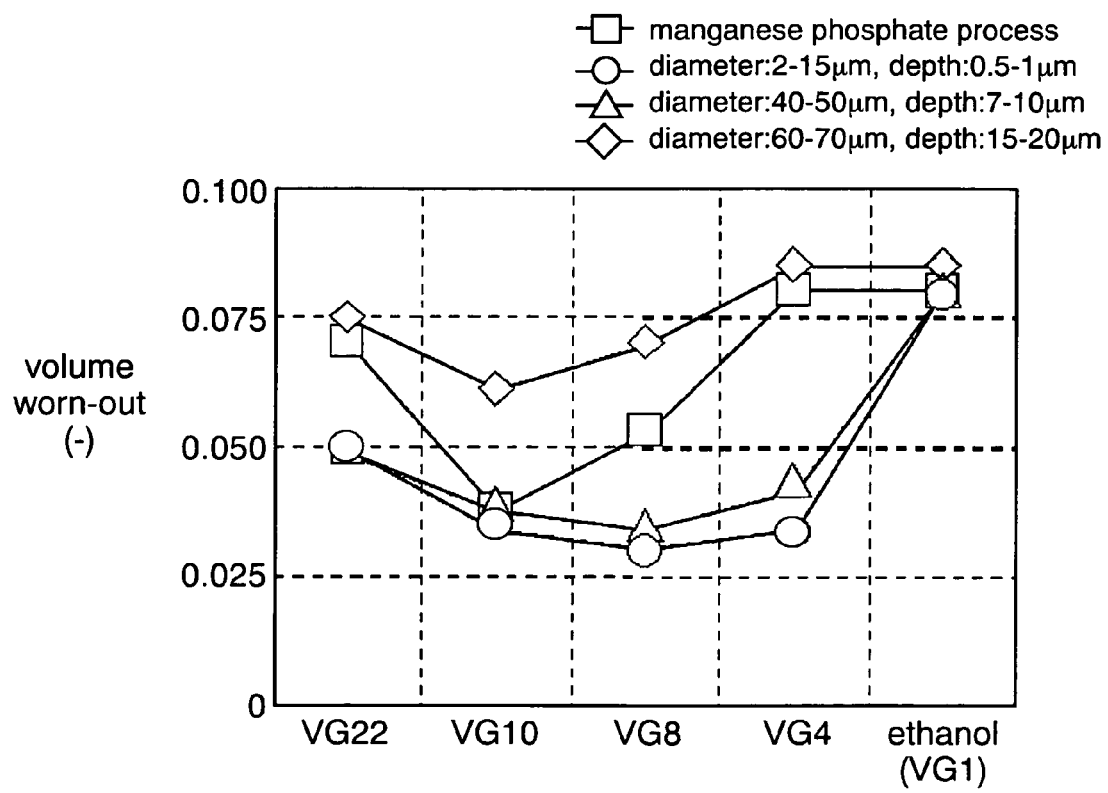
FIG. 13 shows characteristics of friction coefficient between a sliding face and a manganese phosphate layer in accordance with the exemplary embodiment of the present invention.
Figure 14:
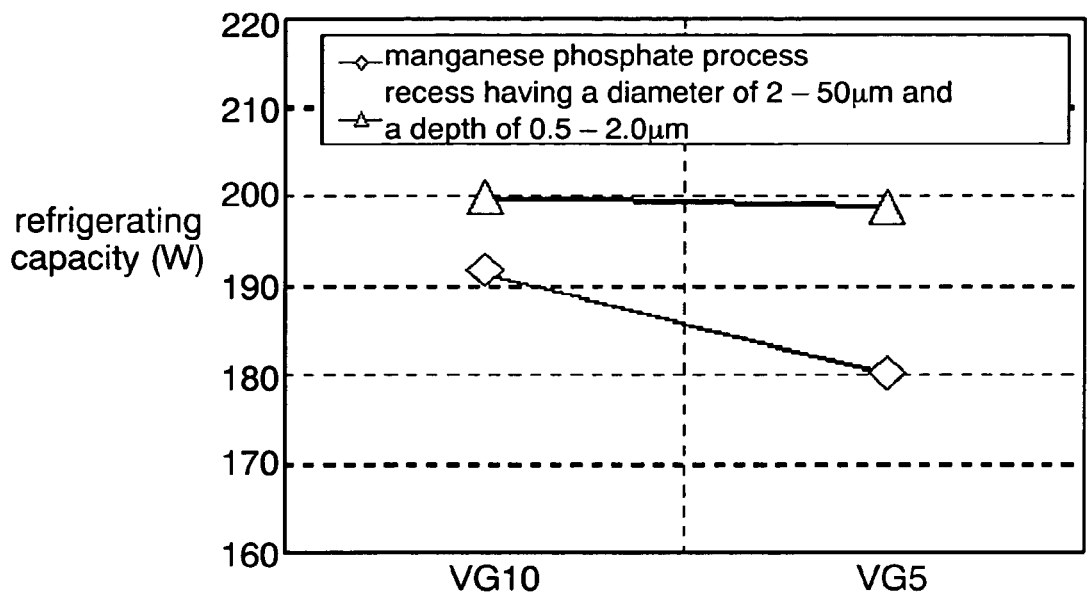
FIG. 14 shows characteristics of refrigerating capacity of the compressor in accordance with an exemplary embodiment of the present invention.
Figure 15:
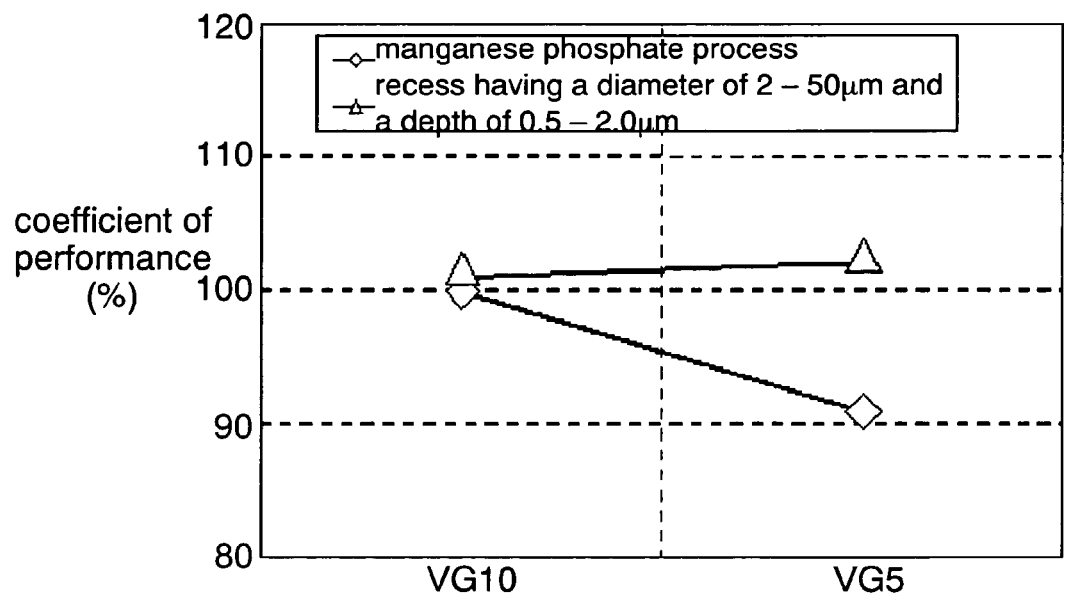
FIG. 15 shows efficiencies of the compressor in accordance with an exemplary embodiment of the present invention.

Next, the relation between a size of recess 123 and a viscosity of oil 103 is described in the case of refrigerant 102 easy-solvable in oil 103. FIG. 13 shows the characteristics of friction coefficients between the sliding face, on which fine recesses are formed almost uniformly, and a manganese phosphate layer. FIG. 14 shows the characteristics of refrigerating capacity of the compressors of which sliding faces are provided with fine recesses almost uniformly or with a manganese phosphate layer. FIG. 15 shows the characteristics of efficiency of the compressors of which sliding faces are provided with fine recesses almost uniformly or with a manganese phosphate layer.

In FIG. 1, container 101 is filled with refrigerant gas 102 made from isobutane, and pools oil 103, made from mineral oil and having a viscosity less than VG10 and not less than VG5, at its bottom. Other structures remain unchanged as previously discussed.

Movements at respective sliding sections formed by the following elements are demonstrated hereinafter: main shaft 109 and bearing 114; piston 115 and bore 113; piston-pin 117 and connecting rod 118; eccentric section 110 and connecting rod 118. The case of piston 115 is demonstrated as an example.

At the respective sliding sections, since oil 103 has a viscosity as low as less than VG10 and not less than VG5, contacts between solid bodies tend to occur. Further, since the refrigerant is formed of isobutane, it tends to dissolve into oil 103 formed of mineral oil, so that the viscosity of the oil lowers, which invites the solid contacts more frequently.

However, as shown in FIG. 3, the flow of oil, which generates oil film in sliding of the sliding sections, produces a vertex flow in spherical recess 123 with ease, and thus an oil pressure is generated, which prevents the solid contacts. As a result, the abrasion resistance is improved. The formation of recesses 123 reduces slid area of the sliding sections, so that the metal contacts can be reduced.

On top of that, since recesses 123 are formed by crashing steel balls or ceramic balls having a high hardness to the sliding faces at a speed higher than a certain level, the hardness of the surface increases because of work hardening. Therefore, even if the contacts between solid bodies happen, abnormal abrasion can be prevented, which improves the abrasion resistance. In particular, in the case of the sliding section formed by piston 115 and bore 113, or piston-pin 117 and connecting rod 118, the relative sliding speed becomes 0 m/sec twice per compressing process. The oil pressure thus becomes 0 (zero), which tends to invite the solid contacts. The technique discussed above is thus substantially effective to the foregoing sliding sections.

Friction coefficients in the cases of a sliding face provided with fine recesses 123 uniformly formed and a sliding face provided with manganese phosphate process are described depending on an oil viscosity. The friction coefficients are measured in the following condition:
    atmospheric pressure in $CH_2FCF_3$ refrigerant; 0.4 Mpa,
    ester oil viscosity; VG4-VG22, and
    ethanol as an oil having viscosity corresponding to VG1.

First, discs are prepared, on which the following recesses 123 are almost uniformly provided,.
    (1) diameter; 2 µm-15 µm, depth; 0.5 µm-1 µm
    (2) diameter; 40 µm-50 µm, depth; 7 µm-10 µm
    (3) diameter; 60 µm-70 µm, depth; 15 µm-20 µm Those discs are rotated at a sliding speed of 1.0 m/sec, and a ring-shaped counterpart member is pressed to those discs at contact pressure of 0.5 MPa. FIG. 13 shows the result of such an abrasion test.

This result tells that the friction coefficient rises with the oil having viscosity less than VG10 in the following two cases: providing manganese phosphate process, providing recesses 123 of diameter of 60 µm-70 µm, depth of 15 µm-20 µm. On the other hand, the friction coefficient does not rise in the following two cases even the viscosity of oil is lowered to VG8: providing recesses 123 of diameter of 40 µm-50 µm, depth of 7 µm-10 µm, providing recesses 123 of diameter of 2 µm-15 µm, depth of 0.5 µm-1 µm. The viscosity is further lowered to VG4 to find the friction coefficient rise slightly. The result tells also the coefficient is lower than that of in the case of providing the manganese phosphate process.

In the case of a sliding face having almost uniform recesses 123 of diameter of 40 µm-50 µm, depth of 7 µm-10 µm, or recesses 123 of diameter of 2 µm-15 µm, depth of 0.5 µm-1 µm, a dynamic pressure between the sliding sections is uniformed, so that the space between the sliding sections becomes constant. Further study in detail of this subject finds that the recesses having an intermediate size between the foregoing two sizes can produce a similar advantage. Volumetric change in recess 123 becomes smaller, so that a pressure at the space between the sliding sections lowers only a little. This pressure is generated when oil 103 including refrigerant 102 is supplied to recesses 123. This mechanism suppresses foaming phenomenon of oil 103, and a breakage in the oil film is prevented, so that an oil pressure of the oil film increases. The load applied to the solid contacts can be thus reduced, thereby lowering the friction coefficient.

FIGS. 14 and 15 show the results of measuring a change in refrigerating capacity of a reciprocating compressor and a change in coefficient of performance (COP) of the compressor using the oil viscosity as a parameter.

The changes are measured in the following conditions: recesses 123 of diameter of 2 µm-50 µm, depth of 0.5 µm-10 µm are uniformly provided to the sliding section of piston 115; isobutane refrigerant, mineral oils of VG5 and VG10 are used; condensation temperature is 54.4° C., evaporation temperature is −23.3° C.; suction gas at a temperature of 32.2° C. before an expansion valve. FIGS. 14 and 15 compare the changes measured in the cases of providing the manganese phosphate process and providing recesses 123.

FIG. 14 shows that the refrigerating capacity substantially lowers to approx. 11 W when the viscosity of oil 103 is lowered from VG10 to VG5 in the compressor using a piston undergone the manganese phosphate process. On the other hand, compressor 100 using a piston with recesses 123 lowers in the refrigerating capacity by as small as only 1 W.

When piston 115 reciprocates in bore 113 and compresses refrigerant gas 102, the viscosity of oil 103 is so low that its sealing property lowers. Refrigerant gas 102 compressed in compressing room 116 thus leaks from the space between piston 115 and bore 113 into container 101, so that the refrigerating capacity tends to lower. However, recesses 123 provided to piston 115 form wedge-shaped oil film, which reduces a leaking amount of the refrigerant gas from the space between piston 115 and bore 113.

To be more specific, when refrigerant gas 102 leaking from the space between piston 115 and bore 113 reaches recess 123, the volume of the space between piston 115 and bore 113 increases at recess 123. Thus a similar operation to a labyrinth seal happens, so that the flow speed of leaking gas 102 sharply slows down, which reduces a leakage amount of gas 102. As a result, the decrease in refrigerating capacity of the compressor is suppressed within a substantially small amount.

In the same manner, FIG. 15 shows that compressor 100 using piston 115 with recesses 123 increases its COP more than that of the compressor using the piston with manganese phosphate process, where the COP indicates an efficiency of a compressor. This is because, as FIG. 14 shows, the decrease in refrigerating capacity of compressor 100 is suppressed within a so small amount that the volumetric efficiency is kept unchanged. As shown in FIG. 13, this is also because the rise of the friction coefficient is extremely smaller than the piston undergone the manganese phosphate process, so that the input is reduced. The decrease of oil viscosity from VG10 to VG5 lowers the viscous resistance. This fact contributes greatly to the decrease of input to the compressor.

In the foregoing description, the combination of isobutane and mineral oil is taken as an example. However, use of propane, which is also hydrocarbon-based refrigerant, as refrigerant 102, or use of alkylbenzene, ester, polyvinylether, polyalkyleneglycol as oil 103, also solves refrigerant 102 into oil 103 to lower the viscosity, and a similar advantage can be expected in the same structure discussed above.

In the foregoing description, recesses 123 of diameter of 2 µm-50 µm, depth of 0.5 µm-10 µm are almost uniformly provided to both of the sliding sections; however, recesses 123 can be provided to either one of the sliding sections with a similar advantage.

In the foregoing description, the case where fine recesses 123 are formed on piston 115 is discussed; however, a similar advantage can be obtained in other sliding sections in the same manner.

The oil viscosity is preferably ranges from less than VG10 to not less than VG5. This viscosity allows recess 123 to retain oil 103, so that oil 103 is always maintained on the sliding face. In sliding, the space between the sliding sections changes minutely, which generates dynamic pressure therebetween, so that the oil film can be maintained with ease, and a frequency of solid contacts is reduced. At the sealed section, the sealing property is improved, so that the reliability and efficiency are improved.

Exemplary Embodiment 2

Figure 16:
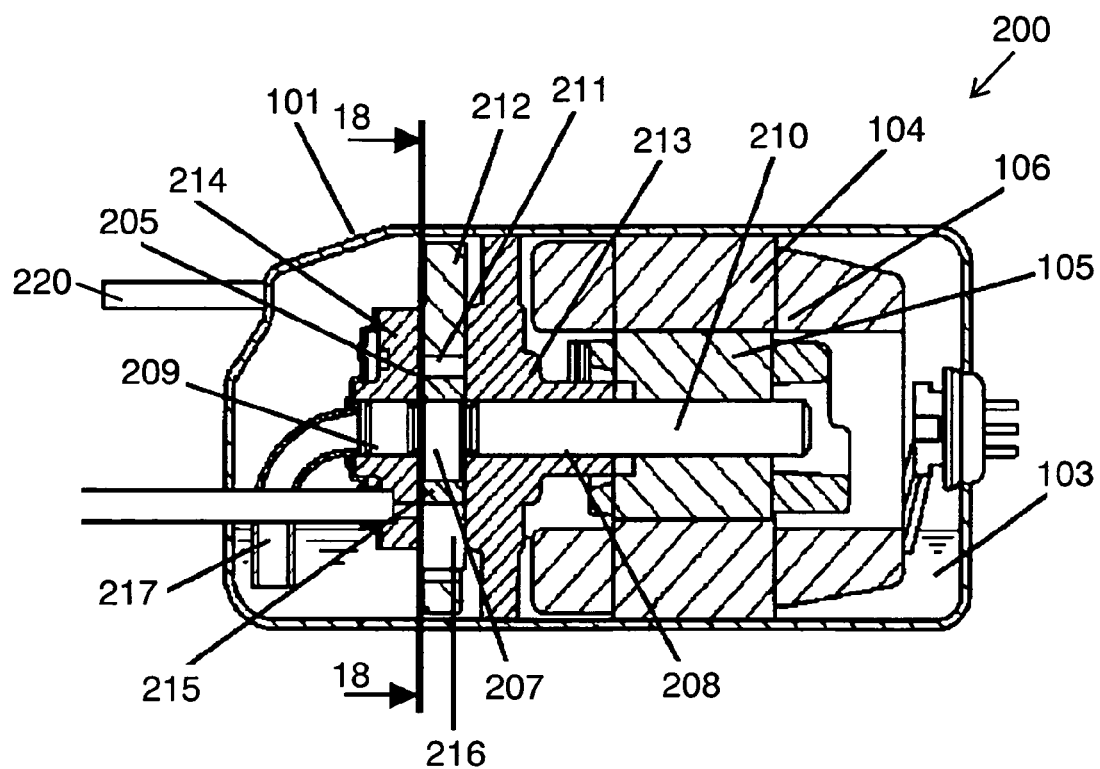
FIG. 16 shows a sectional view of another refrigerant compressor in accordance with an exemplary embodiment of the present invention.
Figure 17:
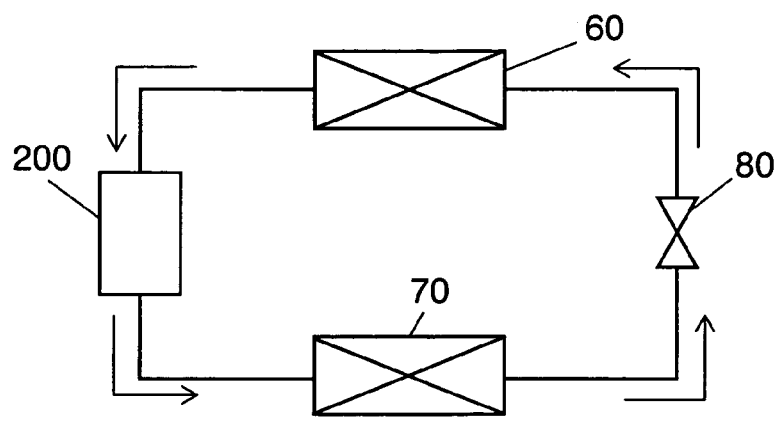
FIG. 17 shows a refrigerating cycle of the refrigerator which includes the compressor shown in FIG. 16.
Figure 18:
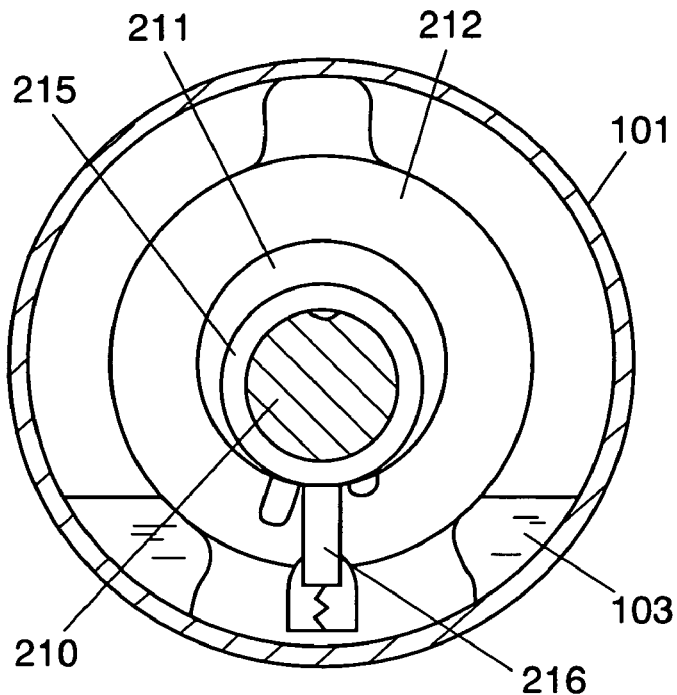
FIG. 18 shows a sectional view taken along line 18-18 of FIG. 16.
Figure 19:
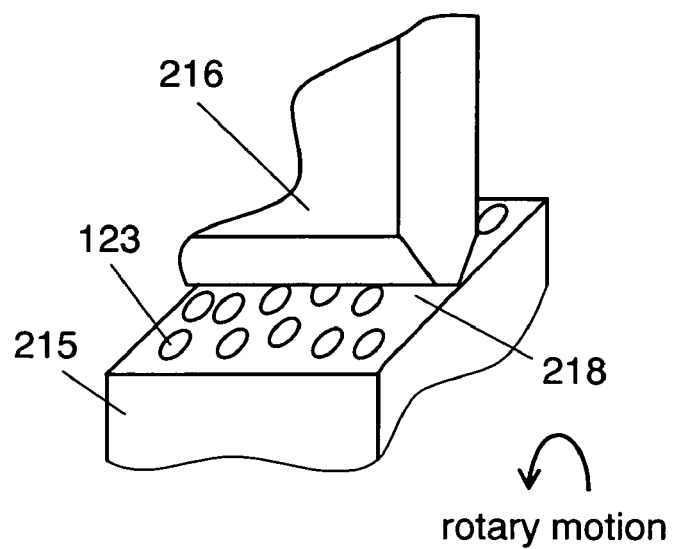
FIG. 19 shows an enlarged view of a sliding section formed by the vane and the rolling piston shown in FIG. 18.
Figure 20:
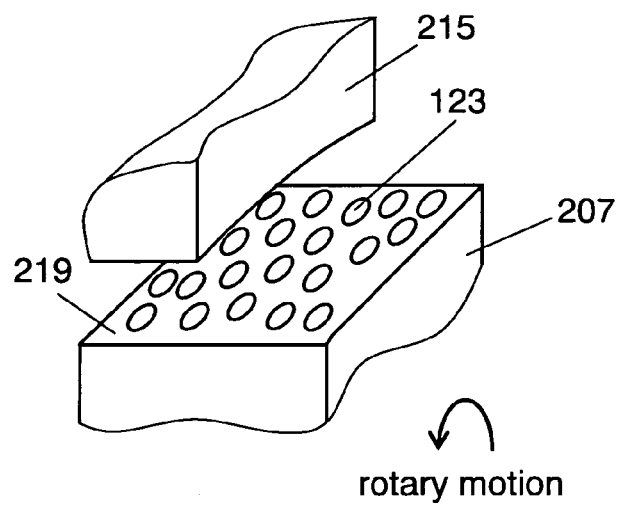
FIG. 20 shows an enlarged view of a sliding section formed by the rolling piston and the eccentric section shown in FIG. 18.

FIG. 16 shows a sectional view of compressor 200 in accordance with a second exemplary embodiment of the present invention. FIG. 17 shows a refrigerating cycle of a refrigerating machine which includes compressor 200 shown in FIG. 16. FIG. 18 shows a sectional view taken along line 18-18 of FIG. 16. FIG. 19 shows an enlarged view of a section contacting between vane 216 and rolling piston (hereinafter referred to simply as piston) 215 shown in FIG. 18. FIG. 20 shows an enlarged view of a section contacting between piston 215 and eccentric section 207 shown in FIG. 18.

Closed container (hereinafter referred to simply as "container") 101 accommodates motor section 106 formed of stator 104 and rotor 105, rolling-piston compressor section 205 driven by motor section 106, and oil 103. Motor section 106 works as a driver.

Compressor section 205 has shaft 210, cylinder 212, main-bearing 213, sub-bearing 214, piston 215, and plate-like vane 216. Shaft 210 has eccentric section 207, main shaft 208 and sub-shaft 209. Cylinder 212 forms compressing room 211. Main bearing 213 and sub-bearing 214 seal both of the end faces of cylinder 212, and rotatably support main shaft 208 and sub-shaft 209 respectively. Piston 215 is loosely fitted in eccentric section 207 and rolls in compressing room 211. Vane 216 is pressed by piston 215, thereby partitioning off compressing room 211 into a high pressure side and a low pressure side. Rotor 105 is fixed to main shaft 208.

Oil pump 217 fixed to sub-bearing 214 communicates with oil 103, and supplies oil 103 to respective sliding sections formed by the following elements: eccentric section 207 and piston 215; main shaft 208 and main bearing 213; sub-shaft 209 and sub-bearing 214. The foregoing elements that form the sliding sections are contact sections sliding against each other due to the driving of compressor section 200.

As shown in FIGS. 19 and 20, fine recesses (hereinafter referred to simply as recesses) 123 are formed almost uniformly on sliding face 218 of piston 215 and sliding face 219 of eccentric section 207. Although it is not shown in the drawings, recesses 123 are formed almost uniformly on a sliding face of main shaft 208 and a sliding face of sub-shaft 209. Recesses 123 are preferably shaped spherical similar to those in the first embodiment, and the size of recess 123 is preferably of diameter of 20 μm-50 μm and depth of 1 μm-10 μm. Further, the recesses preferably account for 40-80% of the surface area of the each sliding face. In the case of using iron-based material, the surface of the sliding section preferably undergoes martensitic process.

An operation of compressor 200 structured above is demonstrated hereinafter.

The rotation of rotor 105 accompanies the spin of shaft 210, and piston 215 loosely fitted in eccentric section 207 rolls in compressing room 211. Then respective volumes of the high pressure side and the low pressure side in compressing room 211 partitioned off by vane 216 change continuously. The refrigerant gas is thus continuously compressed. The compressed gas is discharged into container 101 and sent to heat exchanger 70 via discharging path 220, then dissipates the heat to the outside and returns to heat exchanger 60 via expansion valve 80, and collects heat from the outside. The refrigerating machine thus works.

As discussed above, container 101 has high-pressure atmosphere therein. The high-pressure in container 101 works as back pressure to vane 216, so that the ambient pressure in container 101 urges the tip of vane 216 against the outer surface of piston 215. At the section where the tip of vane 216 is urged against the outer surface of piston 215, the contact is produced by the arc of vane 216 and the arc of piston 215, i.e. line contact is produced, so that metal contact happens frequently.

Recesses 123 are formed almost uniformly on the outer surface of piston 215, so that the sliding area is reduced, and the metal contact decreases. Recesses 123 retain oil 103, so that the sliding section always maintains oil 103. The locked load is thus increased, and abnormal abrasion can be prevented. Recesses 123 can be formed on vane 216 instead of on the outer surface of piston 215, or they can be formed on both of outer surface of piston 215 and vane 216 with a similar advantage.

The spin of shaft 210 accompanies the supply of oil 103 from oil pump 217 to respective sliding sections. Recesses 123 are formed almost uniformly on sliding section 219 of eccentric section 207, sliding sections of main shaft 208 and sub-shaft 209. Oil 103 is thus drawn into the spaces between respective sliding sections formed by eccentric section 207 and piston 215, main shaft 208 and main bearing 213, and sub-shaft 209 and sub-bearing 214, so that wedge-shaped oil film is formed there.

In compressor 200 using a rolling piston, piston 215 is loosely and rotatably fitted in eccentric section 207. The relative speed of piston 215 vs. eccentric section 207 is smaller than those of main shaft 208 vs. main bearing 215, and sub-shaft 209 vs. sub-bearing 214. Sommerfeld constant S, which indicates the characteristics of journal bearing and found from formula (1), thus becomes smaller, which is disadvantageous to lubricating the sliding sections.

$$S = \mu \times N/P \times (R/C)^2 \tag{1}$$

As formula (1) tells, Sommerfeld constant S is found by R: radius of the bearing, C: clearance (space) of between piston 215 and eccentric section 207 in radius, N: speed, μ: viscosity of the oil, and P: contact pressure.

However, the space changes in response to a depth of recesses 123, so that the oil is drawn into the space between piston 215 and eccentric section 207 and the wedge-shaped oil film is formed even if the sliding speed is slow.

Further in the compressor using the rolling piston, container 101 has a condensation pressure therein, so that the internal pressure is high, and oil 103 dissolves into the refrigerant with ease. The viscosity of the oil thus lowers, and Sommerfeld constant S becomes smaller, which is disadvantageous to lubricating the sliding sections.

However, since recesses 123 are minutely formed, when oil 103 in which the refrigerant dissolves is supplied into recesses 123, the volume of oil 103 changes only a little and the ambient pressure lowers only a little. In other words, the compressed refrigerant gas keeps its pressure high. Thus a decrease of a solvable amount of refrigerant into the oil is suppressed, and a foaming phenomenon of the refrigerant in the oil decreases, so that the foaming phenomenon of refrigerant in the oil is suppressed. Because the foaming phenomenon invites breakage of the oil film, the decrease of the foaming will prevent the metal contact, and prevents the friction coefficient from rising.

Recesses 123 are almost uniformly to the sliding faces of eccentric section 207, main shaft 208, and sub-bearing 209. Recesses 123 can be provided to the inner surface of piston 215, main bearing 213, and sub-bearing 214, or to both of eccentric section 207 and the inner surface of piston 215, both of main shaft 208 and main bearing 213, and both of sub-shaft 209 and sub-bearing 214. Those modifications can obtain a similar advantage to what is discussed previously.

Next, the relation between a size of recess 123 is described in the case of the combination of refrigerant 102 solvable with ease into oil 103.

In FIG. 16, oil 103 enclosed in container 101 is made from mineral oil and has a viscosity less than VG10 and not less than VG5. Refrigerant gas (not shown) is made from isobutane.

As it is already discussed, eccentric section 207 and piston 215, main shaft 208 and main bearing 213, sub-shaft 209 and sub-bearing 214, respectively form the sliding sections each other. Recesses 123 are formed almost uniformly on iron-based material which is the base material of those sliding sections. The size of recesses 123 is of diameter of 2-50 μm, depth of 0.5-10 μm. Recesses 123 are formed by crashing steel balls or ceramic balls having a high hardness to sliding face 219 of eccentric section 207 at a speed higher than a certain level. The surface hardness of sliding face 219 increases because of work hardening. This method increases the abrasion resistance, and even if the contacts between solid bodies happen, abnormal abrasion can be prevented. The foregoing size of recesses 123 reduces the occurrence of solid contacts even if the refrigerant is easily solvable into oil 103, thereby preventing the friction coefficient from rising as in the first exemplary embodiment.

In the foregoing description, a combination of isobutane and mineral oil is taken as an example. However, use of propane, which is also hydrocarbon-based refrigerant, as refrigerant 102, or use of alkylbenzene, ester, polyvinylether, polyalkyleneglycol and so on as oil 103, also solves the refrigerant into oil 103 to lower the viscosity, and a similar advantage can be expected in the same structure as discussed above.

Exemplary Embodiment 3

The compressor in accordance with the present exemplary embodiment has basically a similar structure to that shown in FIG. 1 described in the first embodiment. The structure here differs from the first one in respective sliding sections formed by the following elements: main shaft 109 and bearing 114; piston 115 and bore 113; piston-pin 117 and connecting rod 118; eccentric section 110 and connecting rod 118. The elements forming the sliding sections are contact sections that contact with each other by driving compressor section 107.

Figure 21A:
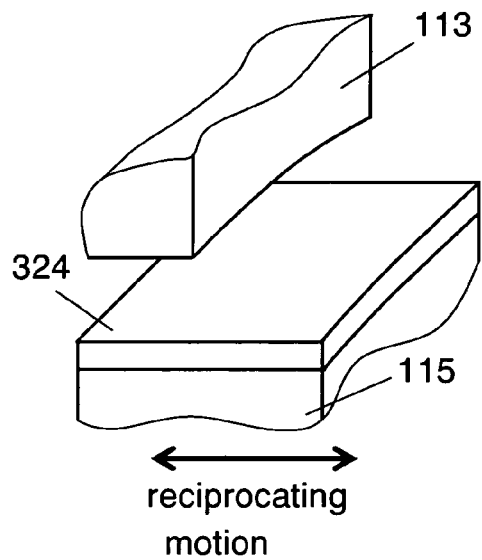
FIGS. 21A and 21B show enlarged views of a sliding section formed by the piston and the bore in accordance with an exemplary embodiment of the present invention.
Figure 21B:
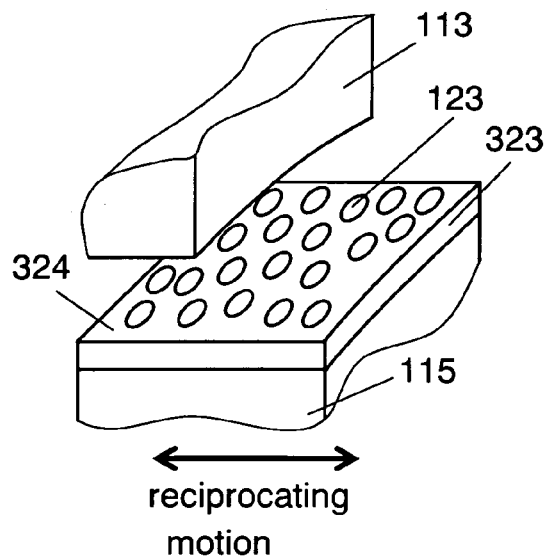

FIGS. 21A, B show enlarged views of the sliding section formed by piston 115 and bore 113. In FIG. 21A, mixed layer 323, to which molybdenum disulfide ($MoS_2$) is bound, is formed on sliding face 324, which is the surface of iron-based material, i.e. base material of piston 115. Purity of $MoS_2$ is preferably not lower than 98%, and as shown in FIG. 21B, fine recesses 123 are preferably formed almost uniformly on sliding face 324. Further the surface of each one of recesses 123 preferably shapes like a sphere, and the recess preferably has a diameter of 2-20 μm, and a depth of 0.2-1.0 μm.

A method of forming $MoS_2$ on sliding face 324 as shown in FIG. 21A is demonstrated hereinafter. Thermosetting resin such as imido group is used as a binder, and this binder is solved into solvent such as dimethylacetamide, then particles of $MoS_2$ are put into this solution. Then the resultant solution is applied to sliding face 324, and it is baked at several hundreds ° C.

Next, a method of forming mixed layer 323 to which $MoS_2$ is bound as shown in FIG. 21B is demonstrated. Particles of $MoS_2$ are crashed to the sliding face at a speed greater than a certain level, which face is made from metal such as iron-based or aluminum-based material which is base material of the sliding section. This method allows parts of $MoS_2$ to dissolve into the base material and form metallic bond due to the heat energy generated in crashing. This metallic bond allows mixed layer 323 to form on the base material, and the impact in crashing forms recesses 123.

An operation of compressor 100 structured above is demonstrated hereinafter with reference to FIG. 1, FIGS. 21A and 21B.

Commercial power is supplied to motor section 106, thereby spinning rotor 105 of motor section 106. Rotor 105 rotates crankshaft 108, and eccentric movement of eccentric section 110 drives piston 115 via connecting rod 118 of the coupling section and piston-pin 117. Piston 115 thus reciprocates in bore 113. Refrigerant gas 102 guided through suction tube 121 into container 101 is sucked from suction muffler 122 and compressed continuously in compressing room 116.

In this case, when piston 115 reaches its top dead center or bottom dead center, the speed becomes 0 m/sec, and metal contacts happen frequently. However, the formation of mixed layer 323, to which $MoS_2$ is bound, on the surface of piston 115 allows $MoS_2$ to exert its self lubricating function, so that the friction coefficient lowers and the abrasion loss decreases.

According to the structure shown in FIG. 21B, recesses 123 are formed almost uniformly on mixed layer 323 of sliding face 324 of piston 115. This structure allows producing a similar advantage to that of the first embodiment. To be more specific, the formation of recesses 123 reduces the slid area between the sliding sections, so that the metal contacts are reduced. When leakage gas from the space between piston 115 and bore 113 reaches recesses 123 on piston 115, the volume of the space between piston 115 and bore 113 increases at each one of recesses 123. Thus a similar operation to a labyrinth seal happens, so that the flow speed of the leakage gas sharply slows down, which reduces a leakage amount of the gas. As a result, the volumetric efficiency of the compressor increases, so that the compression efficiency increases.

Figure 22:
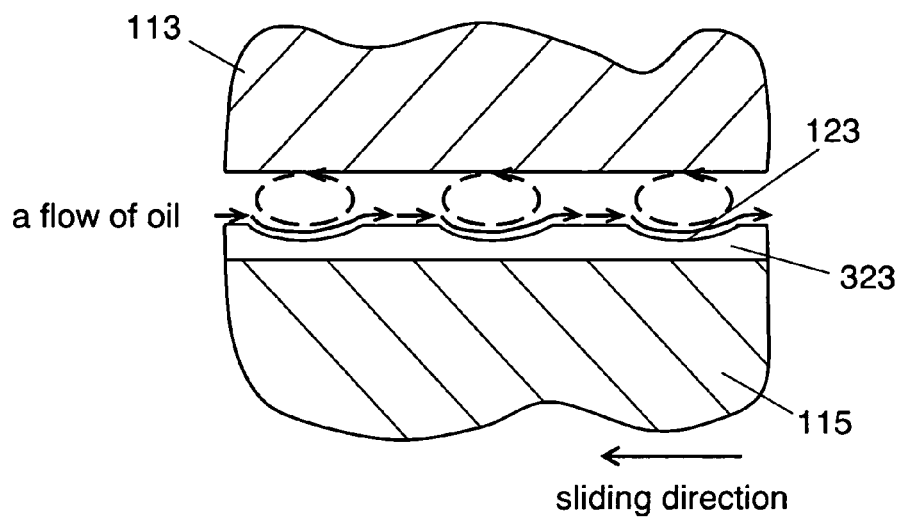
FIG. 22 shows a flow of oil at the sliding section shown in FIG. 21B.

FIG. 22 shows a flow of the oil in sliding of this embodiment. The spherical shape of recess 123 allows the flow of oil 103, which produces oil film at the sliding, to form a vertex flow with ease in the recesses. The vertex flow contributes to generating oil pressure, which prevents the metal contacts, so that the abrasion resistance increases. The spherical shape allows the space between the sliding sections to stay unchanged regardless of a sliding direction, so that the oil film can be formed uniformly overall the sliding sections. A deviation of the space between piston 115 and bore 113 becomes smaller, and thus refrigerant gas 102 leaks in less amount along the side face of piston 115.

Figure 23:
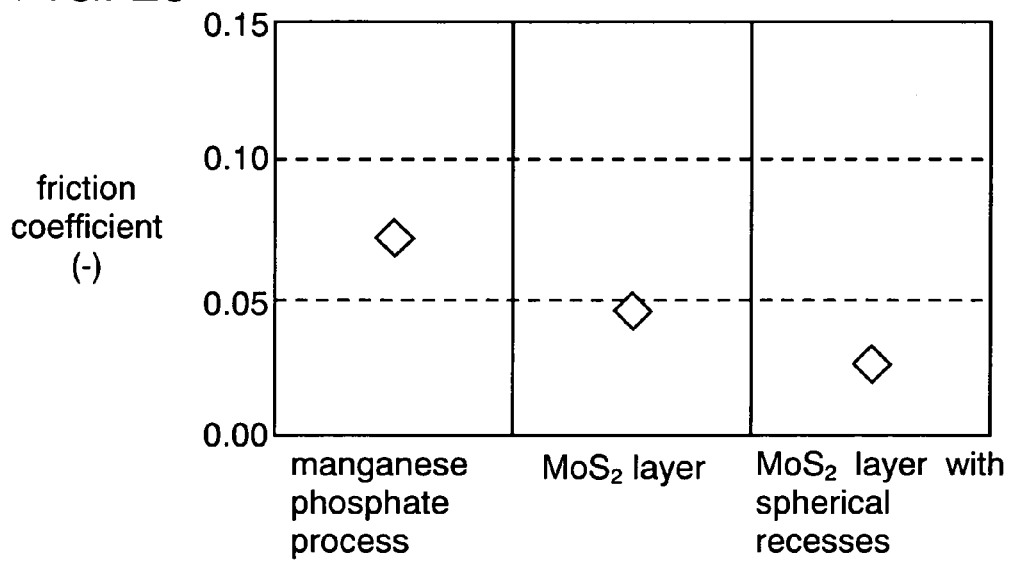
FIG. 23 shows friction coefficients in accordance with an exemplary embodiment of the present invention.

Next, results of measurement of friction coefficients are described referring to FIG. 23 of the characteristics of the friction coefficient. Friction coefficients are measured in the following cases:

a sliding face provided with mixed layer 323 in which $MoS_2$ is bound to the iron-based material, and a sliding face without mixed layer;

a sliding face further provided with fine recesses 123 uniformly formed, and a sliding face provided without recesses 123;

The friction coefficients are measured in the following condition:
 atmospheric pressure in $CH_2FCF_3$ refrigerant; 0.4 MPa,
 ester oil viscosity; VG8-VG10,
 sliding speed; 1.0 m/sec, and
 contact pressure; 0.5 MPa.

The result tells that the presence of mixed layer 323, in which $MoS_2$ is bound to the iron-based material, lowers the friction coefficient comparing with the case of using the sliding face undergone the manganese phosphate process. The structure of $MoS_2$, which forms mixed layer 323, is dense hexagonal system, and the size of its molecule is as small as approx. $6 \times 10^{-4}$ μm. Therefore, when this structure touches the counterpart such as iron-based material or aluminum-based material, the structure is cleaved at a low friction coefficient, so that the friction coefficient at the sliding sections, where the metal contact happens, is lowered. The friction coefficient of the impurities such as polyamide-imidic resin (PAI) used as binder is higher than that of $MoS_2$, so that the purity of $MoS_2$ is preferably set at not lower than 98%.

The formation of spherical recesses 123, having a diameter of 2-20 μm and a depth of 0.2-1.0 μm, on mixed layer 323, in which $MoS_2$ is bound to iron-based material, further lowers the friction coefficient. Because the formation of recesses 123 increases the oil pressure of the wedge-shaped oil film, the load applied to the metal contacting section is reduced, and the friction coefficient lowers.

Figure 24:
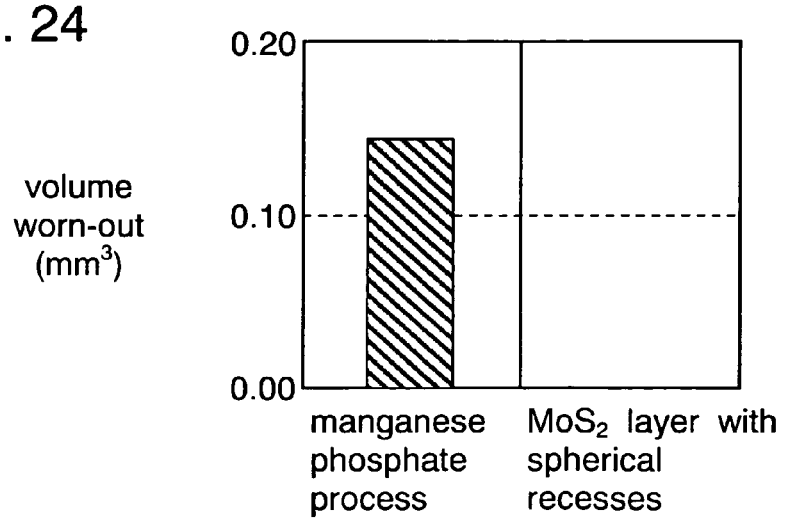
FIG. 24 shows amounts of abrasive wear in accordance with an exemplary embodiment of the present invention.

An amount of abrasive wear is measured when spherical recesses 123 having a diameter of 2-20 μm and a depth of 0.2-1.0 μm are formed on mixed layer 323 in which $MoS_2$ is bound to the iron-based material. FIG. 24 shows the characteristics of the amount of abrasive wear in the following two cases: a sliding face provided with mixed layer 323 on which recesses 123 are formed almost uniformly; a sliding face without mixed layer and undergone manganese phosphate process. The amounts are measured in the following conditions:
 atmospheric pressure in $CH_2FCF_3$ refrigerant; 0.4 MPa,
 ester oil viscosity; VG8-VG10;
 sliding speed; 1.0 m/sec, and
 contact pressure; 0.5 MPa
 time of test; 20 hours The result tells that mixed layer with recesses 123 produces less amount of abrasive wear than manganese phosphate process does. Because the formation of recesses 123 reduces the slid area between the sliding sections, the metal contacts are reduced. The oil pressure of the wedge-shaped oil film is increased, so that the load applied to the metal contacting section is lowered. Further, the method of crashing the particles of $MoS_2$ to the surface of iron-based material forms mixed layer 323, to which $MoS_2$ is bound, and recesses 123 simultaneously. Thus $MoS_2$ enters into the base material and parts of $MoS_2$ form intermetallic compound, thereby further increasing the abrasion resistance.

In this embodiment, mixed layer 323 to which $MoS_2$ is bound is provided to sliding face 324 of piston 115, and on top of that, recesses 123 having a diameter of 2-20 μm and a depth of 0.2-1.0 μm are formed almost uniformly. Such mixed layer 323 can be provided to bore 113, or to both of piston 115 and bore 113 with a similar advantage.

Figure 25A:
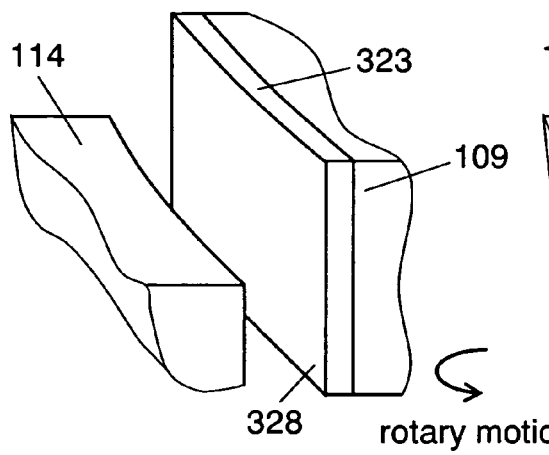
FIGS. 25A and 25B show enlarged views of a sliding section formed by the main shaft and the bearing shown in FIG. 1.

Next, the sliding section formed by main shaft 109 and bearing 114 is described. FIGS. 25A, B show enlarged views of the sliding section formed by main shaft 109 and bearing 114.

Figure 25B:
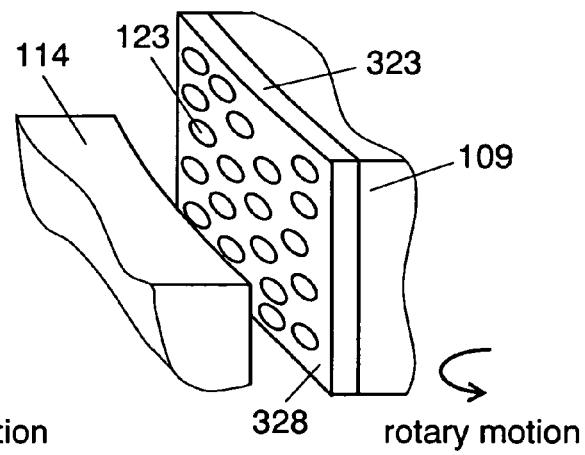

Main shaft 109 of crankshaft 108 is made from mainly iron-based material, and $MoS_2$ is input in this base material, so that mixed layer 323, in which $MoS_2$ is bound to metal material, is formed. More preferable state of mixed layer 323 is previously discussed. FIG. 25B shows the case where recesses 123 are formed on sliding face 328, i.e. the surface of mixed layer 323.

The formation of mixed layer 323 lowers the friction coefficient of the sliding section, so that even if metal contacts happen between bearing 114 and crankshaft 108 when the compressor starts operating, losses due to the sliding can be reduced. Meanwhile at the operation start, no lubrication is done to the sliding sections yet.

On top of that, the formation of recesses 123 almost uniformly on mixed layer 323 obtains a similar advantage to that of the first embodiment.

In this embodiment, mixed layer 323, to which $MoS_2$ is bound, is provided to main shaft 109. Further, recesses 123 having a diameter of 2-20 μm and a depth of 0.2-1.0 μm are formed almost uniformly on mixed layer 323. Mixed layer 323 can be provided to bearing 114, or to both of main shaft 109 and bearing 114 with a similar advantage.

Figure 26A:
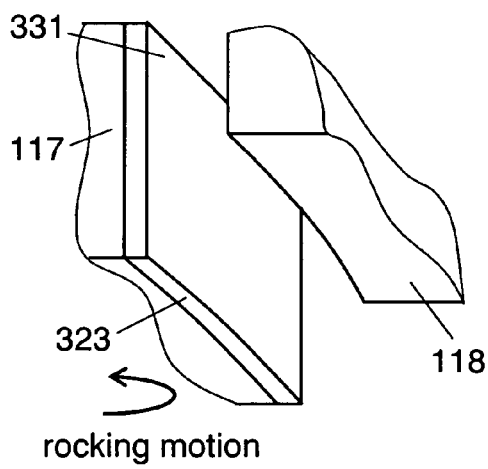
FIGS. 26A and 26B show enlarged views of another sliding section formed by the piston and the connecting rod shown in FIG. 1.

Next, the sliding section formed by connecting rod 118 and piston-pin 117 is described hereinafter. FIGS. 26A, B show enlarged views of the sliding section formed by connecting rod 118 and piston-pin 117.

Figure 26B:
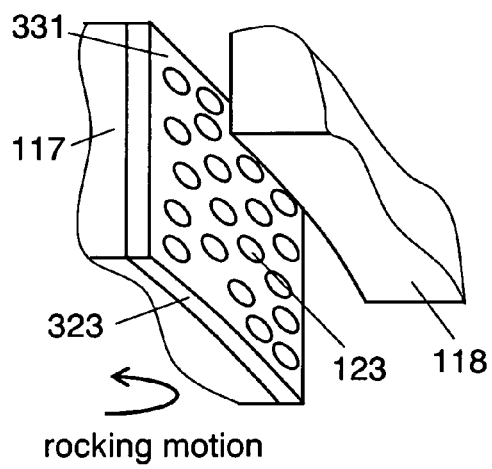

Mixed layer 323, to which $MoS_2$ is bound, is formed on sliding face 331 of piston-pin 117. More preferable state of mixed layer 323 is previously discussed. FIG. 26B shows the case where recesses 123 are formed almost uniformly on the surface of mixed layer 323.

Connecting rod 118 and piston-pin 117 move at speed 0 m/sec when piston 115 reaches its top dead center or bottom dead center, and the oil film cannot be formed, so that metal contacts happen. In such a case, the formation of mixed layer 323 lowers the friction coefficient of the sliding sections, and the loss due to the sliding can be reduced.

On top of that, the formation of recesses 123 almost uniformly on mixed layer 323 obtains a similar advantage to that of the first embodiment.

In this embodiment, mixed layer 323, to which $MoS_2$ is bound, is provided to sliding face 331 of piston 117. Further, recesses 123 having a diameter of 2-20 μm and a depth of 0.2-1.0 μm are formed almost uniformly on mixed layer 323. Mixed layer 323 can be provided to connecting rod 118, or to both of piston-pin 117 and connecting rod 118 with a similar advantage.

Figure 27A:
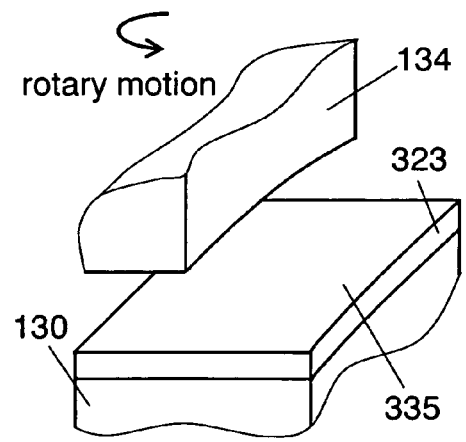
FIGS. 27A and 27B show enlarged views of another sliding section formed by the thrust section and the thrust washer shown in FIG. 1.

Next, the sliding section formed at thrust bearing 135 is described. FIGS. 27A, B show enlarged views of a section where thrust section 130 contacts thrust washer 134.

Figure 27B:
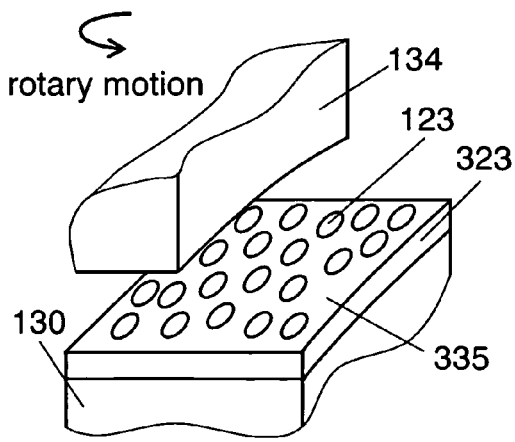

Mixed layer 323, to which $MoS_2$ is bound, is formed on sliding face 335 of thrust section 130. More preferable state of mixed layer 323 is previously discussed. FIG. 27B shows the case where recesses 123 are formed almost uniformly on the surface of mixed layer 323. More preferably state of recesses 123 is previously discussed.

While the compressor is halted, vertical load is applied to thrust bearing 135, and yet, the lubrication is not done yet to the sliding sections and metal contacts happen between thrust section 130 and thrust washer 134 at starting the operation of the compressor. Even in such a case, the formation of mixed layer 323 will lower the friction coefficient, so that the loss due to the sliding can be reduced.

On top of that, the formation of recesses 123 almost uniformly on mixed layer 323 obtains a similar advantage to that of the first embodiment.

In this embodiment, mixed layer 323, to which $MoS_2$ is bound, is provided to sliding face 335 of thrust section 130 of bearing 114. Further, recesses 123 having a diameter of 2-20 μm and a depth of 0.2-1.0 μm are formed almost uniformly on the surface of mixed layer 323. Mixed layer 323 can be provided to thrust washer 134, or to both of thrust section 130 and thrust washer 134 with a similar advantage.

In this embodiment, thrust bearing 135 is formed by flange-face 132, thrust section 130, and thrust washer 134. Mixed layer 323 is formed on sliding face 335. Flange face 136 also exists between main shaft 109 of crankshaft 108 and eccentric section 110. The thrust bearing can be formed by flange face 136 and thrust section 139, which confronts flange face 136, of bearing 114. In this case, mixed layer 323 is provided to thrust section 137. In the case of forming the thrust bearing as discussed above, a similar advantage to what is discussed previously is obtainable.

Mixed layer 323 can be provided to thrust washer 134, or to both of thrust washer 134 and thrust section 130 with a similar advantage. Mixed layer 323 also can be provided to thrust washer 134 at its face contacting the flange face of rotor 105. Mixed layer 323 can be provided to flange face of rotor 105. Mixed layer 323 can be provided to thrust section 137 of crankshaft 108, or to both of thrust section 137 of crankshaft 108 and thrust section 139 of bearing 114 with a similar advantage.

Use of isobutane or propane, which are hydrocarbon-based refrigerant, as refrigerant 102, or use of mineral oil, alkylbenzene, ester, polyvinylether, polyalkyleneglycol as oil 103, also solves refrigerant 102 into oil 103 to lower the viscosity, and a similar advantage can be expected in the same structure as discussed above. This is detailed below.

Figure 28:
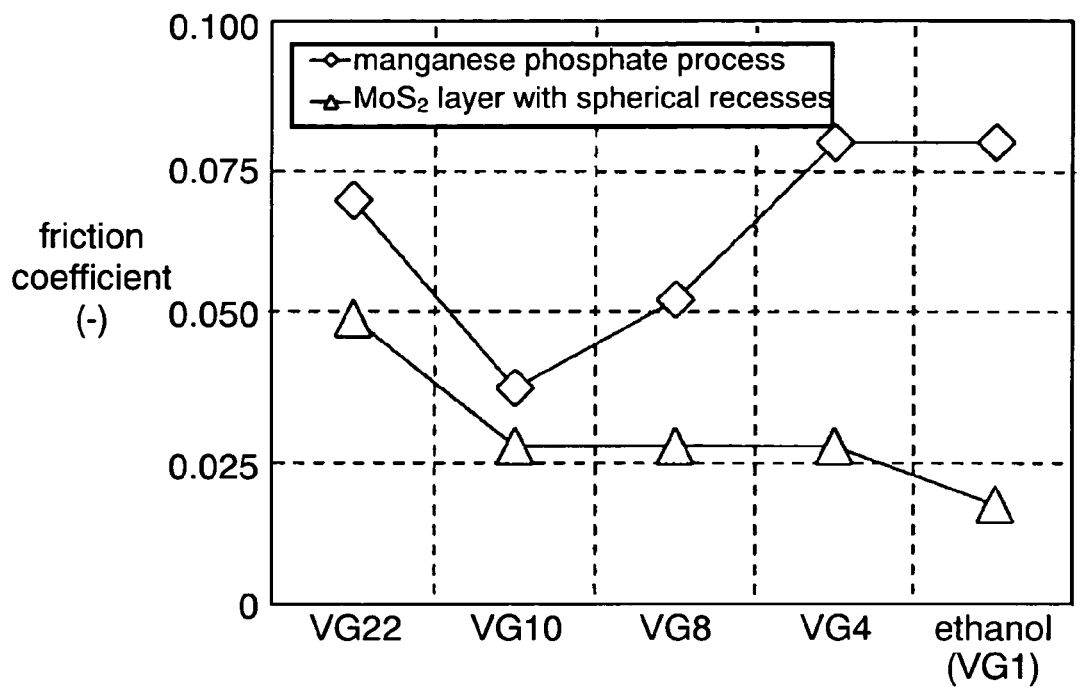
FIG. 28 shows characteristics of friction coefficients in accordance with an exemplary embodiment of the present invention.
Figure 29:
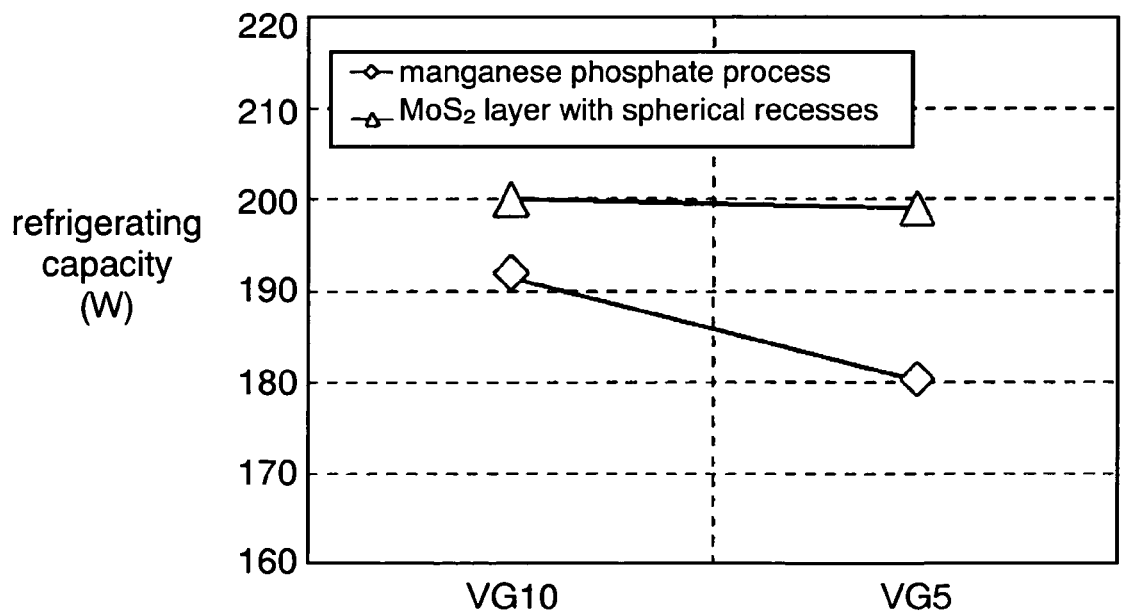
FIG. 29 shows characteristics of refrigerating capacity of the compressor in accordance with an exemplary embodiment of the present invention.
Figure 30:
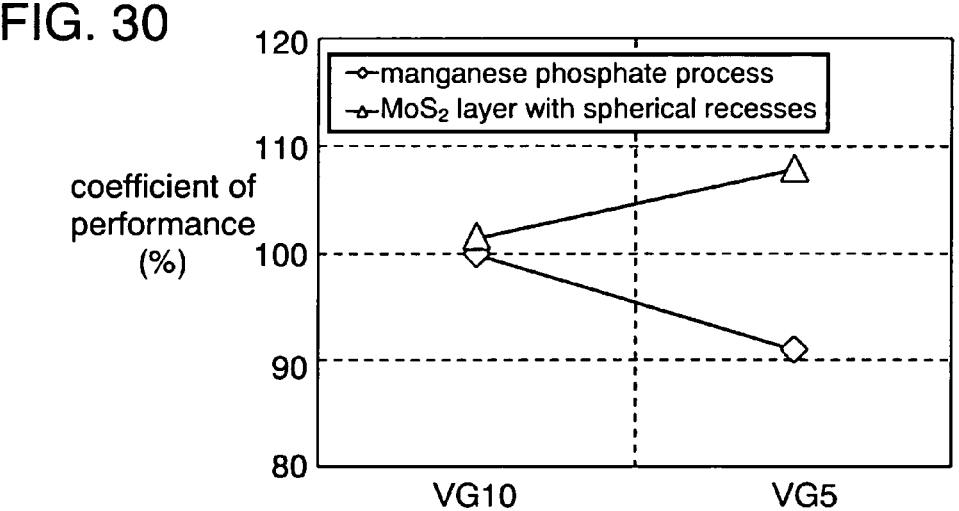
FIG. 30 shows characteristics of efficiencies of the compressor in accordance with an exemplary embodiment of the present invention.

FIG. 28 shows the characteristics of friction coefficients in the following two cases: one case where fine recesses 123 are formed on mixed layer 323 to which $MoO_2$ is bound; the other case where a manganese phosphate layer is formed. FIG. 29 shows the characteristics of refrigerating capacity of two compressors including the piston and bore having the structures discussed above, namely, one compressor with mixed layer 323, and the other compressor with the manganese phosphate layer. FIG. 30 shows the coefficients of efficiency of the foregoing two compressors.

In FIG. 1, container 101 is filled with refrigerant gas 102 made from isobutane, and pools oil 103, made from mineral oil and having a viscosity less than VG10 and not less than VG1, at its bottom. Container 101 accommodates motor section 106 having stator 104 and rotor 105 as well as reciprocating compressor section 107 driven by motor section 106.

Sliding sections are formed by the following elements: main shaft 109 and bearing 114; piston 115 and bore 113; piston-pin 117 and connecting rod 118; eccentric section 110 and connecting rod 118. Those sliding sections are the contact sections that contact with each other by driving compressor section 107.

On the surface of the foregoing sliding sections of which base material is iron-based material, mixed layer 323 to which $MoS_2$ is bound is formed. On top of that, recesses 123 having a diameter of 2-50 μm and a depth of 0.5-10 μm are formed almost uniformly At the respective sliding sections, since oil 103 has a viscosity as low as less than VG10 and not less than VG1, solid contacts between the sliding components tend to occur. Further, since the refrigerant is formed of isobutane, it tends to dissolve into oil 103, so that the viscosity of oil 103 lowers, which invites the solid contacts more frequently. In the case of the sliding sections formed by piston 115 and bore 113, or by piston-pin 117 and connecting rod 118, the relative sliding speed becomes 0 m/sec twice per compressing process. The oil pressure thus becomes 0 (zero), which invites the solid contacts.

However, since piston 115 has mixed layer 323, to which $MoS_2$ is bound, on its surface layer, the solid lubricating function of $MoS_2$ works, so that abnormal abrasion is prevented, and the friction coefficient lowers and the loss due to the sliding can be reduced.

Further, as shown in FIG. 22, the flow of oil, which generates oil film in sliding, produces a vertex flow in recess 123 with ease, and thus an oil pressure is generated, which prevents the solid contacts and improves the abrasion resistance.

A friction coefficient in response to the changes of viscosity of oil 103 is described with reference to FIG. 28. The friction coefficient is measured in the following conditions:

atmospheric pressure in $CH_2FCF_3$ refrigerant; 0.4 MPa,
ester oil viscosity; VG4-VG22,
ethanol as an oil having a viscosity corresponding to VG1,
sliding speed; 1.0 m/sec, and
contact pressure ; 0.5 MPa.

The result tells that the sliding section with only the manganese phosphate process increases its friction coefficient at the oil viscosity less than VG10. On the other hand, the sliding section with mixed layer 323 having recesses 123 shows no increase in the friction coefficient at the oil viscosity lowered to as low as VG1, which is lower than the case of the manganese phosphate process.

FIGS. 29 and 30 show the results of measuring a change in refrigerating capacity of a reciprocating compressor and a change in coefficient of performance (COP) of the compressor using the oil viscosity as a parameter. Piston 115 made from iron-based material has mixed layer 323, to which $MoS_2$ is bound, on its sliding face, and mixed layer has recesses 123 of diameter of 2 μm-50 82 m, depth of 0.5 μm-10 μm uniformly formed. The changes are measured in the following conditions: isobutane refrigerant and mineral oils of VG5 and VG10 are used; condensation temperature is 54.4° C., evaporation temperature is −23.3° C.; suction gas has a temperature of 32.2° C. before an expansion valve.

In FIG. 29, the compressor having a piston undergone the manganese phosphate process shows a substantial decrease in refrigerating capacity when the viscosity of oil 103 is lowered from VG10 to VG5. On the other hand, the compressor having a piston with mixed layer 323 shows only a little reduction in the refrigerating capacity.

This fact is seemed to be caused by the effects of recesses 123 as the first embodiment already proves, and mixed layer 323.

In FIG. 30, the compressor having a piston with mixed layer 323 to which recesses 123 are provided, shows a rise of COP, indicating an efficiency of the compressor, while the compressor having a piston undergone the manganese phosphate process shows a decline of COP. Because the decrease in the refrigerating capacity of the compressor is suppressed at an extremely low level as shown in FIG. 29, so that the volumetric efficiency is maintained. As shown in FIG. 28, the rise of the friction coefficient is extremely smaller than the case of manganese phosphate process, the input can be reduced. A lowering in viscous resistance due to the reduction in oil viscosity from VG10 to VG5 substantially contributes to the reduction in the input to the compressor.

In the foregoing description, the combination of isobutane and mineral oil is taken as an example. However, use of propane, which is also hydrocarbon-based refrigerant, as refrigerant 102, or use of alkylbenzene, ester, polyvinylether, polyalkyleneglycol as oil 103, also solves refrigerant 102 into oil 103 to lower the viscosity, and a similar advantage can be expected in the same structure discussed above.

In the foregoing description, mixed layer 323 is prepared to both of the sliding sections contacting each other; however, mixed layer 323 can be provided to either one of the sliding sections with a similar advantage.

In the foregoing description, the case of preparing mixed layer 323 on piston 115 is demonstrated; however, other sliding sections can obtain a similar advantage in the same manner.

The viscosity of oil 103 ranges from less than VG10 to not less than VG1, and if the sliding section retains less amount of oil 103, the solid lubrication function proper to $MoS_2$ in mixed layer 323 formed on the sliding face works to lower the friction coefficient. The loss due to the sliding is thus reduced, and use of oil 103 of low viscosity also reduces the sliding loss.

Exemplary Embodiment 4

The compressor in accordance with a fourth exemplary embodiment has basically a similar structure to that shown in FIG. 16 described in the second embodiment. This compressor differs from that of the second embodiment in the sliding sections formed by the following elements: eccentric section 207 and rolling piston (hereinafter referred to simply as piston) 215; main shaft 208 and main bearing 213; sub-shaft 209 and sub-bearing 214. The foregoing elements forming the sliding sections are contact sections that contact with each other by driving compressor section 205.

Figure 31A:
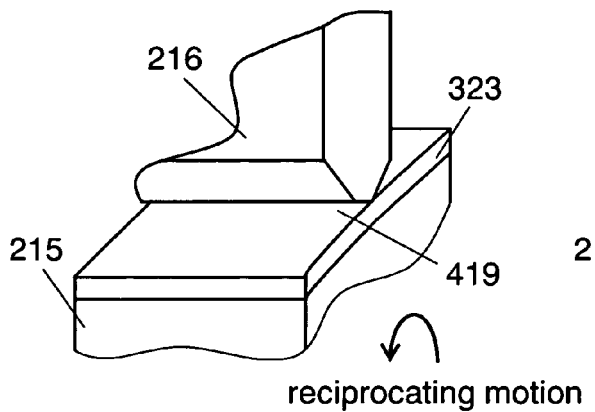
FIGS. 31A and 31B show enlarged views of another sliding section formed by the vane and the rolling piston shown in FIG. 16.
Figure 32A:
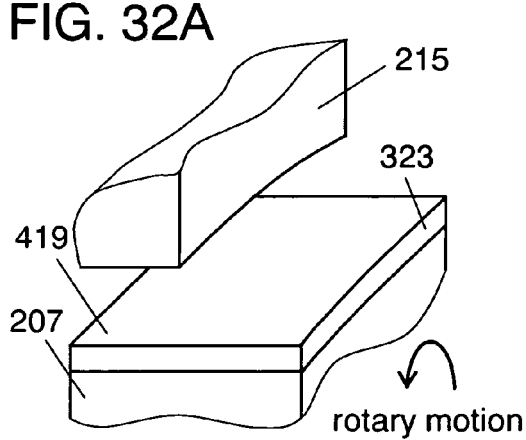
FIGS. 32A, 32B show enlarged views of another sliding section formed by the rolling piston and the eccentric section shown in FIG. 16.

FIGS. 31A, B show enlarged views of the sliding section formed by piston 215 and vane 216. FIGS. 32A, B shows enlarged views of the sliding section formed by piston 215 and eccentric section 207.

Figure 31B:
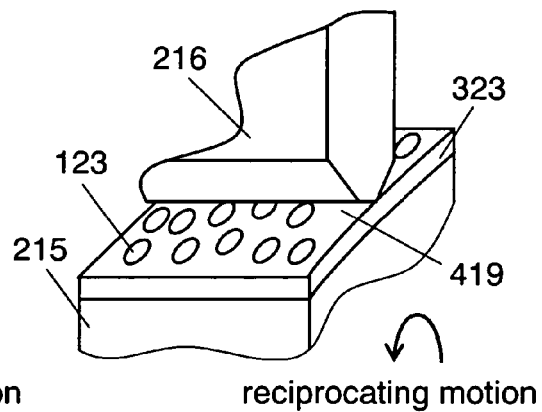
Figure 32B:
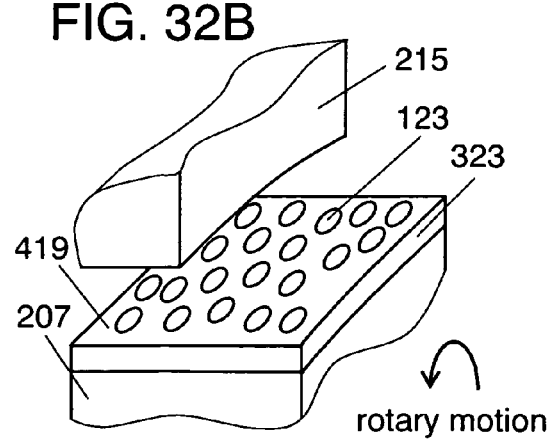

On sliding face 419 of piston 215, mixed layer 323 to which molybdenum disulfide ($MoS_2$) is bound is formed. Mixed layer 323 is also formed on sliding face 419 of eccentric section 207 and the surfaces of sliding sections of main shaft 208 and sub-shaft 209. The purity of $MoS_2$ is set preferably not lower than 98%, and fine recesses 123 are preferably formed almost uniformly on the sliding faces as shown in FIGS. 31B, 32B. Further, each one of recesses 123 preferably has spherical surface and a diameter of 2-20 μm and a depth of 0.2-1.0 μm.

An operation of compressor 200 structured above is demonstrated hereinafter with reference to FIG. 16, FIGS. 31A, B and FIGS. 32A, B.

Motor section 106, namely, the driver, is powered, which accompanies the rotation of rotor 105, then accompanies the spin of shaft 210, then piston 215 loosely fitted in eccentric section 207 rolls in compressing room 211. Then respective volumes of the high pressure side and the low pressure side in compressing room 211 partitioned off by vane 216 change continuously. The refrigerant gas is thus continuously compressed. The compressed gas is discharged into closed container (hereinafter referred to simply as "container") 101, and makes container 101 high pressure atmosphere. The high-pressure in container 101 works as back pressure to vane 216, so that the ambient pressure in container 101 urges the tip of vane 216 against the outer surface of piston 215. At the section where the tip of vane 216 is urged against the outer surface of piston 215, the contact is produced by the arc of vane 216 and the arc of piston 215, i.e. line contact is produced, so that metal contact happens frequently.

In this case, the formation of mixed layer 323 including $MoS_2$ on the outer surface of piston 215 lowers the friction coefficient of the sliding section, so that the loss due to sliding is reduced. In this embodiment, mixed layer 323 is prepared on the outer surface of piston 215; however, it can be prepared on vane 216, or on both of the outer surface of piston 215 and piston 215 with a similar advantage.

The spin of shaft 210 prompts oil pump 217 to lubricate oil 103 to respective sliding sections continuously.

Recesses 123 are formed almost uniformly on mixed layers 323 of the sliding surfaces of eccentric section 207, main shaft 208 and sub-shaft 209. This structure allows producing a similar advantage to that produced in the second embodiment.

As described in the second embodiment, piston 215 is loosely and rotatably fitted in eccentric section 207 in the compressor using a rolling piston. The relative speed of piston 215 vs. eccentric section 207 is smaller than that of main shaft 208 vs. main bearing 215, and that of sub-shaft 209 vs. sub-bearing 214. This status is disadvantageous because metal contacts tend to happen in lubricating the sliding sections. However, mixed layer 323 to which $MoS_2$ is bound is formed on sliding face 419 of eccentric section 207. When the metal contact happens, since the structure of $MoS_2$ is dense hexagonal system, and the size of its molecule is as small as approx. $6 \times 10^{-4}$ μm, the structure is cleaved at a low friction coefficient, so that the friction coefficient at the sliding sections, where the metal contact happens, is lowered. As a result, the sliding loss is reduced.

In the compressor using the rolling piston, container 101 has a condensation pressure therein, so that the internal pressure is high, and oil 103 dissolves into the refrigerant with ease. The viscosity of oil 103 thus lowers, which is also disadvantageous in lubricating the sliding sections; however, since recesses 123 are formed on the surface of mixed layer 323, a similar advantage to that is produced in the second embodiment can be expected.

Mixed layer 323, to which $MoS_2$ is bound, having fine recesses 123 of 2-20 μm across and 0.2-1.0 μm deep, is formed on the sliding faces of eccentric section 207, main shaft 208, sub-shaft 209. Mixed layer 323 can be provided to the inner surface of piston 215, main bearing 213 and sub-bearing 214, or to both of eccentric section 207 and the inner surface of piston 215, main shaft 208 and main bearing 213, sub-shaft 209 and sub-bearing 214. Either structure can produce a similar advantage to what is discussed previously.

Use of isobutane or propane, which is hydrocarbon-based refrigerant, as refrigerant 102, or use of alkylbenzene, ester, polyvinylether, polyalkyleneglycol as oil 103, solves refrigerant 102 into oil 103 to lower the viscosity, so that the abrasion resistance decreases, and a similar advantage can be expected in the same structure as discussed above. This phenomenon is detailed below.

In FIG. 16, oil 103 enclosed in container 101 is made from mineral oil and has a viscosity less than VG10 and not less than VG5. Refrigerant gas (not shown) is made from isobutane.

As it is already discussed, eccentric section 207 and piston 215, main shaft 208 and main bearing 213, and sub-shaft 209 and sub-bearing 214, form the sliding sections respectively. Mixed layer 323 to which $MoO_2$ is bound is formed on the surface of iron-based material, which is the base material of the sliding sections. This structure allows the $MoO_2$ to cleave at a low friction coefficient even solid contacts happen, as demonstrated in the third embodiment. Thus the friction coefficients at the sliding sections lower, and the sliding loss is reduced. On top that, recesses 123 are formed almost uniformly on mixed layer 323. The size of each one of recesses 123 is of diameter of 2-50 μm, depth of 0.5-10 m, and this size can reduce the frequency of solid contacts, and prevent the friction coefficient from rising, even if the refrigerant is solvable with ease in oil 103, as demonstrated in the second embodiment.

In the foregoing description, a combination of isobutane and mineral oil is taken as an example. However, use of propane, which is also hydrocarbon-based refrigerant, as refrigerant 102, or use of alkylbenzene, ester, polyvinylether, polyalkyleneglycol as oil 103, also solves the refrigerant into oil 103 to lower the viscosity, and a similar advantage can be expected in the same structure as discussed above.

In the embodiments 1-4 discussed previously, compressors working at a constant speed are described. In a climate of using inverter technology, a compressor working at the lower speed has been developed. In the case of driving the compressor at an ultra slow speed such as slower than 20 Hz or starting the compressor at such a slow speed, the compressor encounters abnormal abrasion more often. The present invention exerts its advantage more explicitly in such compressors.

On the other hand, a compressor employing a synchronous induction motor, which works as an induction motor at the start then operates synchronizing with the power supply frequency, produces strong accelerating force when it enters to a synchronous operation at the start. Thus such a compressor encounters abnormal abrasion more often. The present invention exerts its advantage more explicitly in such compressors.

According to the principle of the formation of oil film, use of materials other than iron-based one, for example aluminum-based one, as the sliding sections will also produce a similar advantage to what is discussed previously.

Exemplary Embodiment 5

The compressor in accordance with the present exemplary embodiment has basically a similar structure to that shown in FIG. 1 described in the first embodiment. This compressor differs from that of the first embodiment in suction valve device 527 provided to valve plate 119 and discharging valve device 534.

Figure 33:
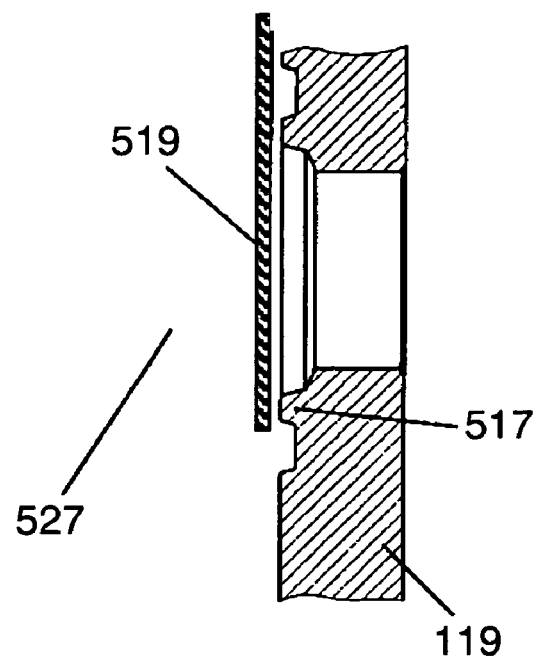
FIG. 33 shows a vertical sectional view of a sucking valve device disposed in the compressor in accordance with an exemplary embodiment of the present invention.
Figure 34:
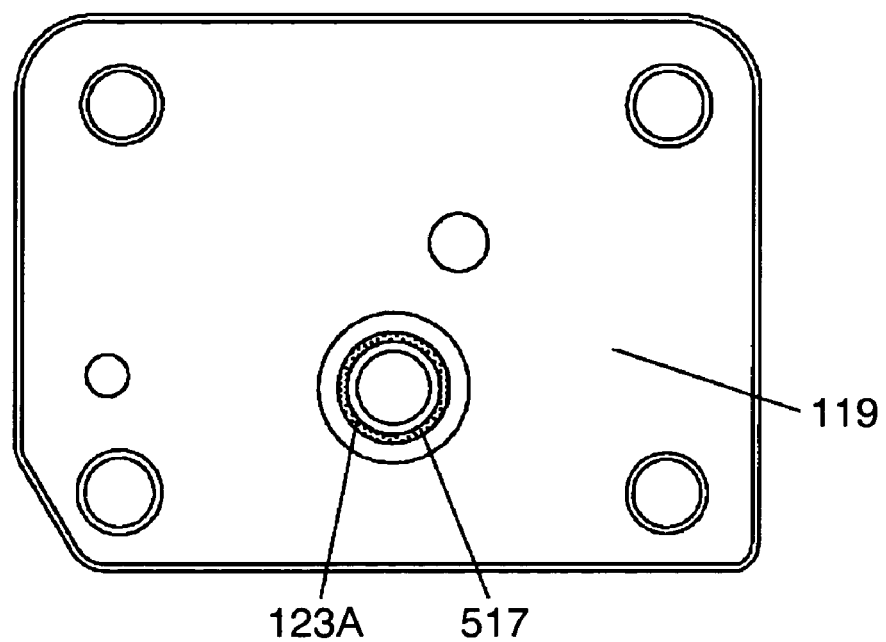
FIG. 34 shows a plan view of a valve port of the sucking valve device shown in FIG. 33.
Figure 35:
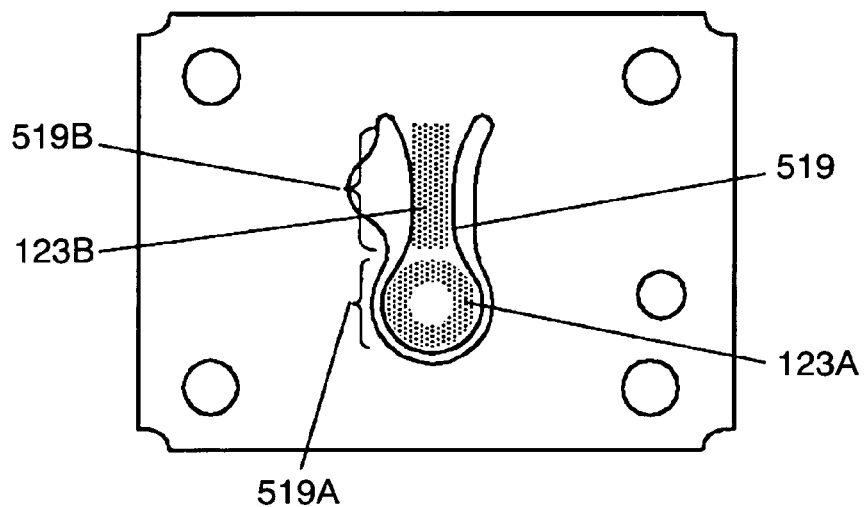
FIG. 35 shows a plan view of a sucking valve of the sucking valve device shown in FIG. 33.

First, the suction valve device is demonstrated. FIG. 33 shows a vertical sectional view of the suction valve device in accordance with this embodiment. FIG. 34 shows a plan view illustrating suction valve port (hereinafter referred to simply as "port") 517. FIG. 35 shows a plan view illustrating suction movable valve (hereinafter referred to simply as "valve") 519 of suction valve device 527.

Valve plate 119 includes port 517, and forms suction valve device 527 together with valve 519. Fine recesses 123A are formed almost uniformly on the mutual sealing faces of port 517 and sealing section 519A of valve 519. Port 517 and sealing section 519A of valve 519 are contact sections which are brought into contact with each other by driving compressor 107. Fine recesses 123B are formed on arm 519B of valve 519. Recesses 123A, 123B preferably shape in spherical and have a diameter of 2-20 μm, a depth of 0.2-1.0 μm. The recesses 123A, 123B preferably account for 40-80% of the surface area of respective mutual sealing faces.

A method of forming recesses 123A on port 517 and valve 519 is similar to the method of forming recesses 123 demonstrated in the first embodiment. In the case of using a leaf spring having martensitic surface structure as port 519, the method similar to the one in the first embodiment can be used.

An operation of the compressor structured above is demonstrated hereinafter with reference to FIG. 1 and FIGS. 33-35.

Commercial power is supplied to motor section 106 as a driver, thereby spinning rotor 105 of motor section 106. Rotor 105 rotates crankshaft 108, and. eccentric movement of eccentric section 110 drives piston 115 via connecting rod 118 of the coupling section and piston-pin 117. Piston 115 thus reciprocates in bore 113. Refrigerant gas 102 guided through suction tube 121 into closed container (hereinafter referred to simply as "container") 101 is sucked from suction muffler 122 via suction valve device 527 and compressed continuously in compressing room 116.

Refrigerant gas 102 sucked from suction valve device 527 includes a small amount of oil 103 in misting state, so that gas 102 supplies oil 103 to the mutual sealing faces of port 517 and valve 519 that form suction valve device 527. Oil 103 supplied works as sealing and lubricating the mutual sealing faces.

When recesses 123A are formed, the surface structure of port 517 and valve 519 are undergone martensitic process, so that the surface strength is increased. Thus the abrasion resistance and impact resistance are increased. The formation of recesses 123A reduces the area between the contact sections, so that metal contacts are reduced.

Piston 115 reciprocates in bore 113 and compresses refrigerant gas 102. At this time, parts of compressed gas 102 leak from the sealing face of valve device 527 to suction muffler 122. This leakage lowers the volumetric efficiency. However, according to this embodiment, recesses 123A are formed almost uniformly on seat 517 and sealing section 519A of valve 519 that form suction valve device 527, and oil 103 remains there, which resists compressed refrigerant gas 102 leaking. The spherical shape of recess 123A increases the volume comparing with a polygonal pyramid having the same area projected to the surface, so that an amount of oil 103 remaining increases. As a result, an amount of leakage of gas 102 decreases, and the volumetric efficiency of the compressor increases, so that the compression efficiency of the compressor increases.

Oil 103 remaining in recesses 123A contributes to increasing the lubrication on the mutual sealing faces of seat 517 and valve 519, so that the abrasion resistance of suction valve device 527 increases. Oil 103 remaining in recesses 123A damps an impact when valve 519 is seated on port 517, so that it lowers the noises of the compressor caused by the impact due to the seating in valve device 527. When recesses 123B are formed on arm 519B, residual stress of compression is applied to make the surface martensitic, so that the surface hardness increases and the impact resistance also increases. As a result, the strength against fatigue fracture increases.

In this embodiment, recesses 123A are provided to both of port 517 and sealing section 519A of valve 519; however, recesses 123A can be provided to either one. Recesses 123B are provided to both faces of arm 519B of valve 519; however, they can be provided to either one face.

Figure 36:
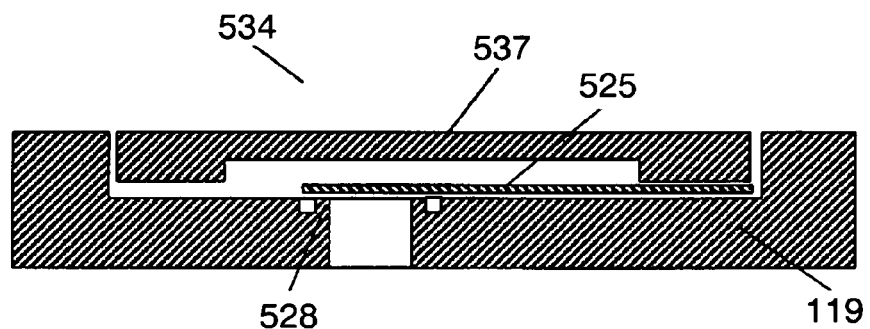
FIG. 36 shows a vertical sectional view of a discharging valve device disposed in the compressor in accordance with an exemplary embodiment of the present invention.
Figure 37:
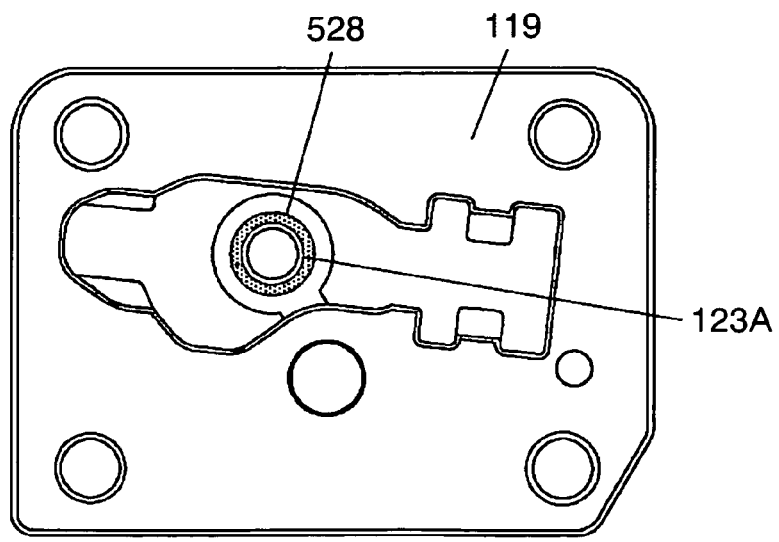
FIG. 37 shows a plan view of a valve port of the discharging valve device shown in FIG. 36.
Figure 38:
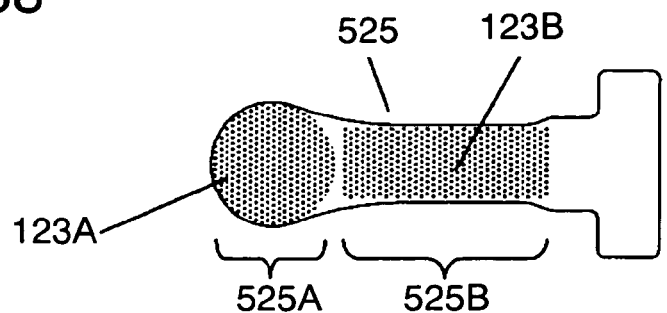
FIG. 38 shows a plan view illustrating a side of mutual sealing face of the discharging valve in the discharging valve device shown in FIG. 36.
Figure 39:
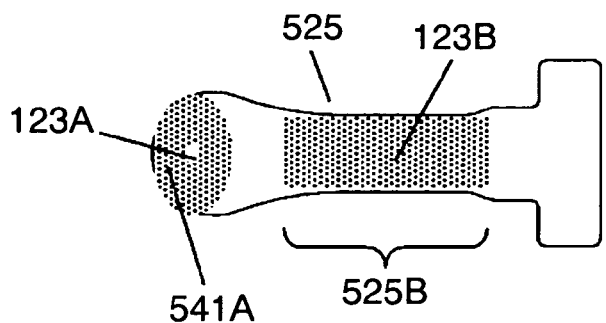
FIG. 39 shows a plan view illustrating a striking section side of a discharging movable valve of the discharging valve device shown in FIG. 36.
Figure 40:
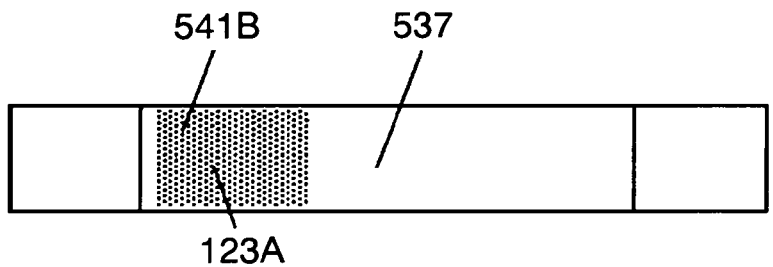
FIG. 40 shows a plan view of a stopper of the discharging valve device shown in FIG. 36.

Next, the discharging valve device is demonstrated. FIG. 36 shows a vertical sectional view of discharging valve device 534 in accordance with the fifth embodiment. FIG. 37 shows a plan view illustrating discharging valve port (port) 528 of discharging valve device 534. FIG. 38 shows a plan view illustrating a mutual sealing face of discharging movable valve (valve) 525 of discharging valve device 534. FIG. 39 shows a plan view illustrating striking section 541A side of valve 525 of discharging valve device 534. FIG. 40 shows a plan view illustrating stopper 537 of discharging valve device 534.

Valve plate 119 includes port 528, and forms discharging valve device 534 together with valve 525 and stopper 537. Port 528 and sealing section 525A of valve 525 are contact sections which are brought into contact with each other by driving compressor section 107. Recesses 123A are formed almost uniformly on the mutual sealing faces of port 528 and sealing section 525A of valve 525. Recesses 123B are formed almost uniformly on arm section 525B of valve 525. Recesses 123A are formed almost uniformly on striking section 541A of valve 525 and striking section 541B of stopper 537. Both of striking sections 541A and 541B are the contact sections which are brought into contact with each other by driving compressor 107. Preferable status of recesses 123A, 123B are similar to what is discussed previously, and a method of forming them is also similar to the previous one.

An operation of the compressor discussed above is demonstrated here. Commercial power is supplied to motor section 106 as a driver, thereby spinning rotor 105 of motor section 106. Rotor 105 rotates crankshaft 108, and eccentric movement of eccentric section 110 drives piston 115 via connecting rod 118 of the coupling section and piston-pin 117. Piston 115 thus reciprocates in bore 113. Refrigerant gas 102 guided through suction tube 121 into container 101 is sucked from suction muffler 122 via suction valve device 527 and compressed continuously in compressing room 116. Compressed refrigerant gas 102 travels through discharging valve device 534 and head 120 and is discharged from a discharging pipe (not shown) to heat exchanger 70 that is a high pressure side of the refrigerating cycle.

Refrigerant gas 102 compressed continuously in compressing room 116 includes a little amount of oil 103 in misting state. Refrigerant gas 102 thus supplies oil 103 to the mutual sealing faces of port 528 and sealing section 525A of valve 525, and to the mutual sealing faces of striking section 541A of valve 525 and striking section 541B of stopper 537. Oil 103 supplied there works as sealing and lubricating the mutual sealing faces and as lubricating striking sections 541A, 541B.

When recesses 123A are formed, the surface structures of port 528, valve 525, striking sections 541A, 541B are undergone martensitic process, so that the surface strength thereof are increased. Thus the abrasion resistance and impact resistance are increased. The formation of recesses 123A reduces the area between the contact sections, so that metal contacts are reduced.

Piston 115 reciprocates in bore 113 to suck and compress refrigerant gas 102. At that time, parts of gas 102 discharged from discharging valve device 534 to head 120 leak from the mutual sealing face of discharging valve device 534 to compressing room 116. Refrigerant gas 102 leaking expands again, thereby lowering the volumetric efficiency. However, in this embodiment, oil 103 remains in recesses 123A formed almost uniformly on the mutual sealing faces of port 528 and sealing section 525A of valve 525 that form discharging valve device 534. Oil 103 resists against refrigerant gas 102 discharged to head 120 and leaking to compressing room 116. The spherical shape of recess 123A increases the volume comparing with a polygonal pyramid having the same area projected to the surface, so that an amount of oil 103 remaining increases. As a result, an amount of leakage of refrigerant gas 102 decreases, and the volumetric efficiency of the compressor increases, so that the compression efficiency of the compressor increases.

Oil 103 remaining in recesses 123A contributes to increasing the lubrication on the mutual sealing faces of port 528 and sealing section 525A of valve 525, so that the abrasion resistance of discharging valve device 534 increases.

Oil 103 remaining in recesses 123A damps an impact when sealing section 525A of valve 525 is seated on port 528, so that it can lower the noises of the compressor caused by the impact due to the seating in valve device 534. When recesses 123B are formed on arm 525B, residual stress of compression is applied to make the surface martensitic, so that the surface hardness increases and the impact resistance also increases. As a result, the strength against fatigue fracture increases.

Oil 103 also remains in recesses 123A formed almost uniformly on striking section 541A of valve 525 and striking section 541B of stopper 537. Oil 103 remaining there increase the lubrication at striking sections 541A, 541B, so that the abrasion resistance of discharging valve device 534 increases.

Oil 103 remaining in recesses 123A works as a damper against an impact when valve 525 opens and crashes to stopper 537. This damper lowers the noises of the compressor due to the open-impact in discharging valve device 534. The martensitic surface increases its own hardness and the impact resistance.

Recesses 123A are provided to all of port 528 and sealing section 525A of valve 525, striking sections 541A and 541B; however, recesses 123A can be provided to either one of the combination. Recesses 123B are provided to both faces of arm 525B of valve 525; however, they can be provided to either one face.

Figure 41:
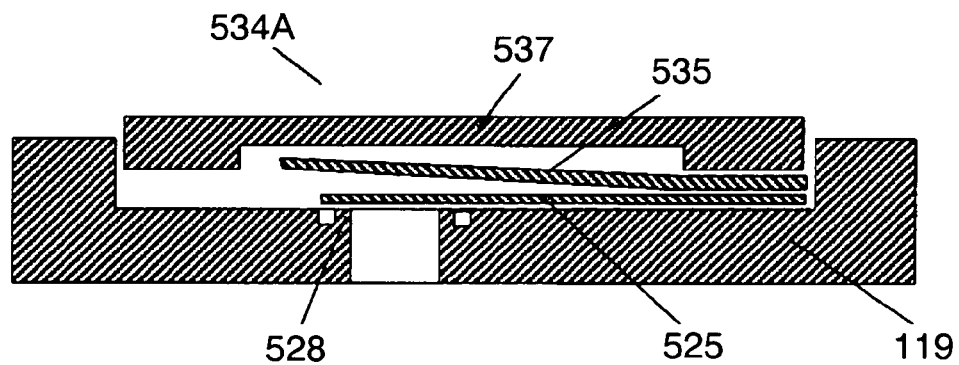
FIG. 41 shows a vertical sectional view of another discharging valve device disposed in the compressor in accordance with an exemplary embodiment of the present invention.
Figure 42:
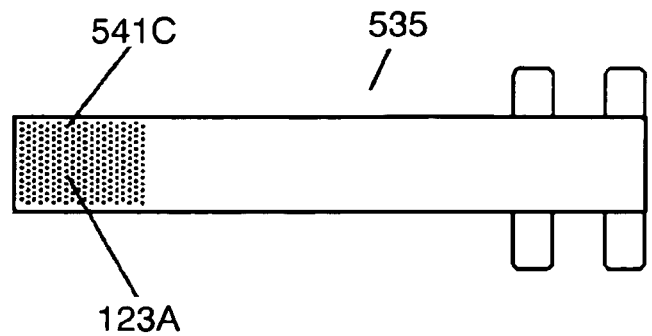
FIG. 42 shows a striking section side of the discharging movable valve against the backup lead of the valve device shown in FIG. 41.
Figure 43:
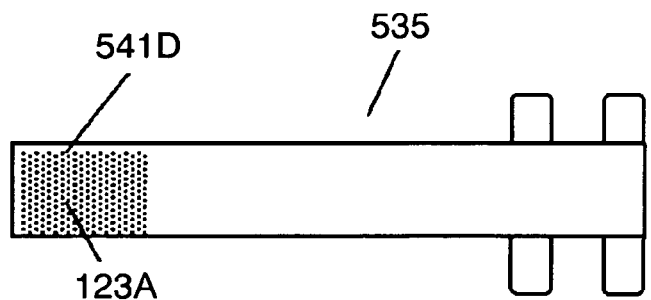
FIG. 43 shows a striking section side of the stopper against the backup lead of the discharging valve device shown in FIG. 41.

Next, a discharging valve device having back-up lead 535 is demonstrated. FIG. 41 shows a vertical sectional view of another discharging valve device 534A in accordance with the embodiment of the present invention. FIG. 42 shows a plan view illustrating striking section 541C side of backup lead 535 of discharging valve device 534A against discharging movable valve (valve) 525. FIG. 43 shows a plan view illustrating striking section 541D side of back-up lead 535 of discharging valve device 534A against stopper 537.

Discharging valve device 534A shown in FIG. 41 has backup lead 535 between valve 525 and stopper 537. Striking section 541A of valve 525 and striking section 541C of backup lead 535, striking section 541D of backup lead 535 and striking section 541B of stopper 537 are contact sections which are brought into contact with each other by driving compressor section 107. Recesses 123A are formed almost uniformly on striking sections 541C and 541D of backup lead 535. The preferable state of recesses 123A is discussed previously, and the method of forming recesses 123A is the same as the one discussed previously. The structures other than what is discussed above remain unchanged from discharging valve device 534 shown in FIG. 36.

An operation of the foregoing compressor is demonstrated hereinafter. Commercial power is supplied to motor section 106, thereby spinning rotor 105 of motor section 106. Rotor 105 rotates crankshaft 108, and eccentric movement of eccentric section 110 drives piston 115 via connecting rod 118 of the coupling section and piston-pin 117. Piston 115 thus reciprocates in bore 113. Refrigerant gas 102 guided through suction tube 121 into container 101 is sucked from suction muffler 122 via suction valve device 527 and is compressed continuously in compressing room 116. Compressed refrigerant gas 102 travels through discharging valve device 534A and head 120 and is discharged from a discharging pipe (not shown) to heat exchanger 70 that is a high pressure side of the refrigerating cycle.

Refrigerant gas 102 compressed continuously in compressing room 116 includes a little amount of oil 103 in misting state. Compressed gas 102 thus supplies oil 103 to striking section 541A of valve 525 that forms discharging valve device 534A, to striking section 541C of backup lead 535, to striking section 541D of backup lead 535, and to striking section 541B of stopper 537 for lubricating those striking sections.

When recesses 123A are formed, respective surface structures of striking section 541A of valve 525, striking section 541C of backup lead 535, striking section 541D of backup lead 535, and striking section 541B of stopper 537 become martensitic, so that the surface strength increases. Thus the abrasion resistance and impact resistance of them increase. The formation of recesses 123A reduces the area between the contact sections, so that metal contacts is reduced.

The spherical shape of recess 123A increases the volume comparing with a polygonal pyramid having the same area projected to the surface, so that an amount of oil 103 remaining increases. Oil 103 remaining in recesses 123A contributes to increment of the lubrication on valve 525 and striking sections 541A, 541C of backup lead 535, and on backup lead 535 and striking sections 541D, 541B of stopper 537. As a result, the abrasion resistance of discharging valve device 534 improves. Oil 103 remaining in recesses 123A works as a damper when valve 525 crashes to backup lead 535, or backup lead 535 crashes to stopper 537, so that the noises of the compressor due to the open-impact in discharging valve device 534A are reduced. Further, the martensitic surface increases its hardness, and the impact resistance of respective contact sections increases.

Recesses 123A are provided to all of port 528 and sealing section 525A of valve 525, striking sections 541A and 541C, striking sections 541D and 541B; however, recesses 123A can be provided to either element of the combination.

The present embodiment proves that the abrasion resistance, impact resistance, and the strength against fatigue fracture increase in the suction valve device and the discharging valve device. The embodiment also proves that the compressing efficiency of the compressor increases, and the noises of the compressor are lowered.

Exemplary Embodiment 6

The compressor in accordance with this exemplary embodiment has basically a similar structure to that shown in FIG. 1 described in the fifth embodiment. This compressor of this embodiment differs from that of the fifth embodiment in suction valve device 527 provided to valve plate 119 and respective contact sections in discharging valve device 534.

Figure 44:
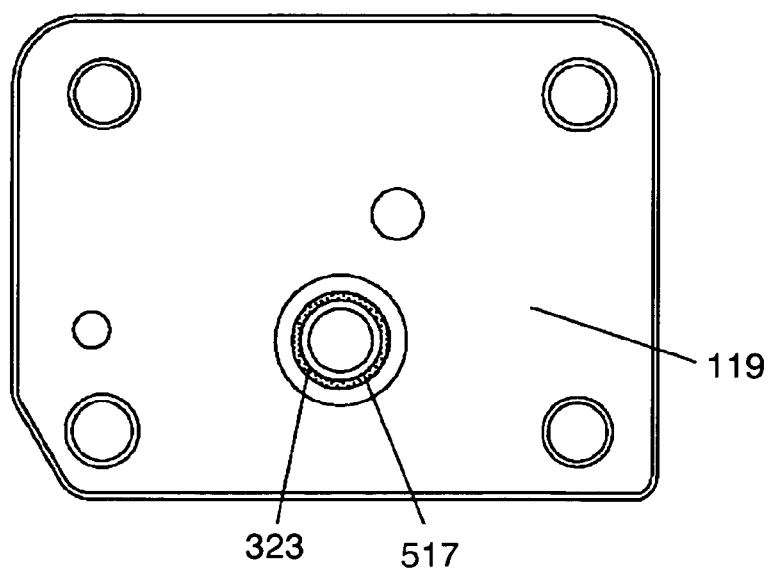
FIG. 44 shows a plan view of another sucking valve port disposed in the sucking valve device shown in FIG. 33.
Figure 45:
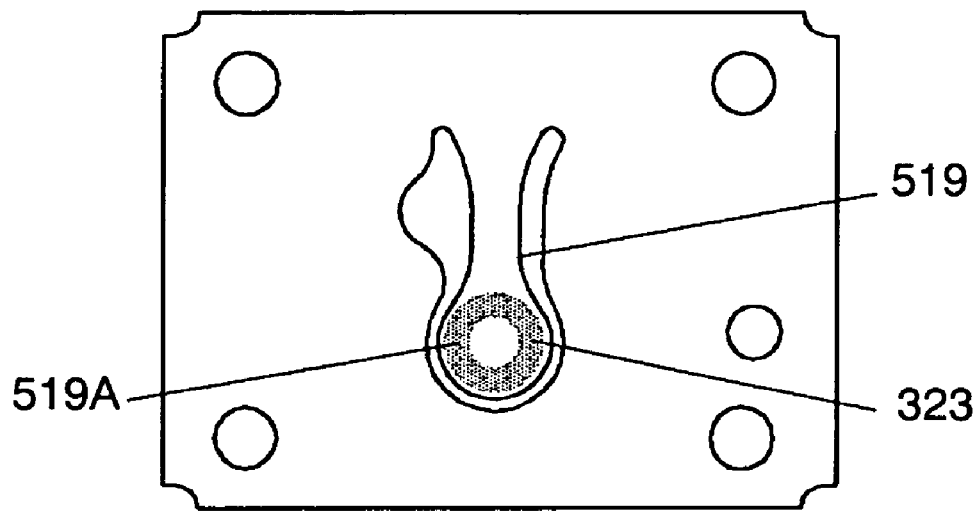
FIG. 45 shows a plan view of another sucking movable valve disposed in the sucking valve device shown in FIG. 33.

First, the suction valve device is described. FIG. 44 shows a plan view illustrating suction valve port (port) 517 of another suction valve device 527 shown in FIG. 33. FIG. 45 shows a plan view illustrating suction movable valve (valve) 519 of suction valve device 527. In the fifth embodiment previously discussed, port 517 and sealing section 519A of valve 519, both are contact sections, have fine recesses 123A. However, in this embodiment, mixed layer 323, to which molybdenum disulfide ($MoS_2$) is bound, is formed. The structures other than this remain unchanged from the suction valve device in accordance with the fifth embodiment.

The method of forming mixed layer 323 on port 517 and valve 519 is similar to that demonstrated in the third embodiment. The method of crashing the fine particles of $MoS_2$ to the surface, in particular, produces heat energy at the crashing, and the heat energy melts parts of $MoS_2$ into the base material for producing metallic bond, thereby forming mixed layer 323. At the same time, the impact in crashing forms fine recesses in a similar way to what is done in the third embodiment. At that time, the structure of the surface layer becomes martensitic, so that port 517 and valve 519 increase their surface strength. In the case of using a leaf spring, of which surface structure is martensitic, as a material of valve 519, the fine recesses can be formed in a similar way.

As discussed above, port 517 and sealing section 519A of valve 519, those are elements of suction valve device 527, have mixed layer 323, to which $MoS_2$ is bound. The self-lubricating function of $MoS_2$ lowers the friction coefficient of mutual sealing faces of port 517 and sealing section 519A, thereby increasing the abrasion resistance. A purity of $MoS_2$ is set at not lower than 98%, so that amounts of impurity materials having high friction coefficients are suppressed as much as possible. As a result, the more effective advantage is obtainable. Formation of the fine recesses almost uniformly on the surface of mixed layer 323 allows oil 103 to remain in the recesses, and a similar advantage to that obtained in the fifth embodiment is obtainable. In this case, a preferable state of the fine recesses is similar to that discussed in the fifth embodiment.

This embodiment, as discussed above, proves that the formation of mixed layer 323 on port 517 and sealing section 519A of valve 519 increases the abrasion resistance of suction valve device 527 of the compressor. Further, the formation of fine recesses uniformly on the surface of mixed layer 323 increases the impact resistance of suction valve device 527, and improves the performance as well as the efficiency of the compressor. Noises due to suction valve device 527 can be lowered.

In this embodiment, mixed layer 323 is provided to both of port 517 and sealing section 519A of valve 519; however, it can be provided to either one. Similar to the fifth embodiment, the fine recesses can be provided to at least one of the faces of arm 519B of valve 519.

Figure 46:
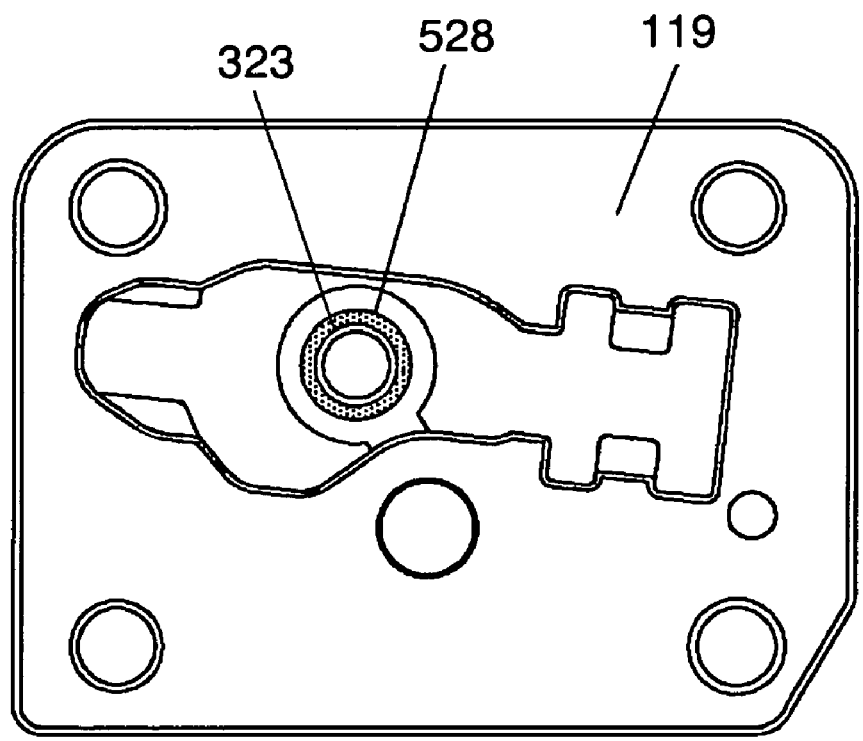
FIG. 46 shows a plan view of another discharging valve port disposed in the discharging valve device shown in FIG. 36.
Figure 47:
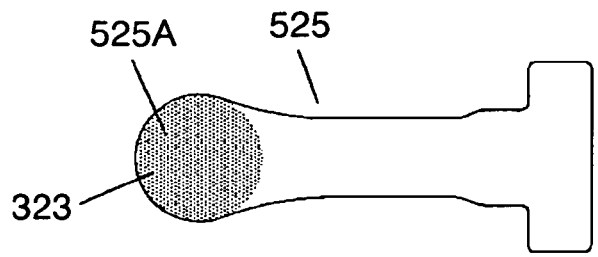
FIG. 47 shows a plan view illustrating mutual-sealing-face side of another discharging movable valve in the discharging valve device shown in FIG. 36.
Figure 48:
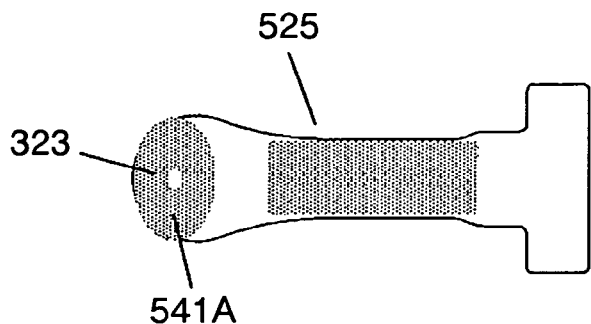
FIG. 48 shows a plan view illustrating a striking section side of another discharging movable valve of the discharging valve device shown in FIG. 36.
Figure 49:
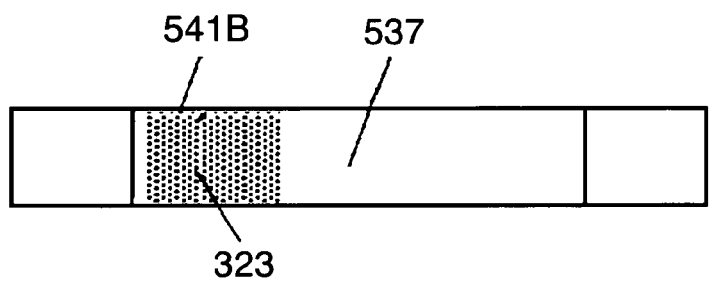
FIG. 49 shows a plan view of another stopper of the discharging valve device shown in FIG. 36.

Next, a discharging valve device is described. FIG. 46 shows a plan view illustrating discharging valve port (port) 528 of another discharging valve device 534 shown in FIG. 36. FIG. 47 shows a plan view illustrating the mutual sealing face side of discharging movable valve (valve) 525 of discharging valve device 534. FIG. 48 shows a plan view illustrating the striking section 541A side of valve 525 of discharging valve device 534. FIG. 49 shows a plan view illustrating stopper 537 of discharging valve device 534.

In the fifth embodiment, fine recesses 123A are provided to the contact sections, namely, port 528, sealing section 525A of valve 525, and striking sections 541A, 541B. In the present embodiment, on the other hand, mixed layer 323 to which $MoS_2$ is bound is formed. The structures other than this remain unchanged from the discharging valve device in accordance with the fifth embodiment.

The method of forming mixed layer 323 on port 528 and valve 525, and striking sections 541A, 541B is similar to that demonstrated in the third embodiment. The method of crashing the fine particles of $MoS_2$ to the surface, in particular, produces heat energy at the crashing, and the heat energy melts parts of $MoS_2$ into the base material for producing metallic bond, thereby forming mixed layer 323. At the same time, the impact at the crash forms fine recesses in a similar way to what is done in the third embodiment. In this case, the structure of the surface layer becomes martensitic, so that port 528 and valve 525, and striking sections 541A, 541B increase their surface strength. In the case of using a leaf spring, of which surface structure is martensitic, as a material of valve 525, the fine recesses can be formed in a similar way.

As discussed above, port 528, sealing section 525A of valve 525, and striking sections 541A, 541B, those are elements of discharging suction valve device 534, are equipped with mixed layer 323, to which $MoS_2$ is bound. The self-lubricating function of $MoS_2$ lowers the friction coefficient of mutual sealing faces of port 528 and sealing section 525A of valve 525, and striking sections 541A, 541B, thereby increasing the abrasion resistance. The purity of $MoS_2$ is set at not lower than 98%, so that amounts of impurity materials having high friction coefficients are suppressed as much as possible. As a result, the more effective advantage is obtainable. Formation of the fine recesses almost uniformly on the surface of mixed layer 323 allows obtaining a similar advantage to that obtained in the fifth embodiment is obtainable. In this case, a preferable state of the fine recesses is similar to that discussed in the fifth embodiment.

This embodiment, as discussed above, proves that the formation of mixed layer 323 on port 528 and sealing section 525A of valve 525, and striking sections 541A, 541B increases the abrasion resistance of discharging valve device 534. Further, the formation of fine recesses uniformly on the surface of mixed layer 323 increases the impact resistance of discharging valve device 534, and improves the performance as well as the efficiency of the compressor. Noises due to discharging valve device 534 can be lowered.

Mixed layer 323 is provided to all of port 528 and sealing section 525A of valve 525, and striking sections 541A and 541B; however, it can be provided to either one element of respective combinations. Similar to the fifth embodiment, the fine recesses can be provided to at least one of the faces of arm 525B of valve 525.

Figure 50:
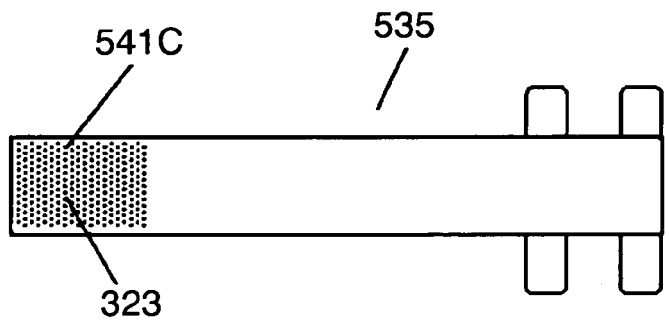
FIG. 50 shows a striking section side of another backup lead against discharging movable valve of the discharging valve device shown in FIG. 41.
Figure 51:
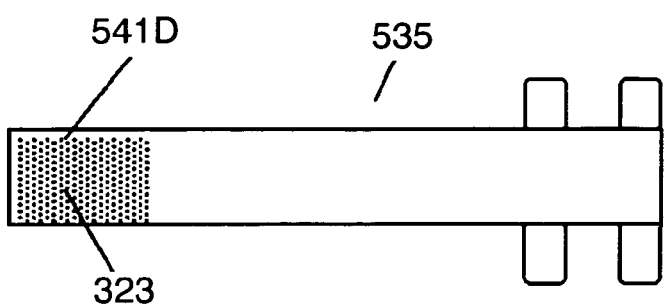
FIG. 51 shows a striking section side of another backup lead against a stopper of the discharging valve device shown in FIG. 41.

Next, a discharging valve device having backup lead 535 is described here. FIG. 50 shows a plan view illustrating the striking section 541C side of backup lead 535 against discharging movable valve (valve) 525 of another discharging valve device 534A shown in FIG. 41. FIG. 51 shows a plan view illustrating the striking section 541D side of backup lead 535 against stopper 537 of discharging valve device 534A.

In the fifth embodiment, fine recesses 123A are provided to contact sections of port 528 and sealing section 525A of valve 525, and striking sections 541A and 541C, striking sections 541D and 541B. In the present embodiment, on the other hand, mixed layer 323 to which MoS$_2$ is bound is formed. The structures other than this remain unchanged from the discharging valve device in accordance with the fifth embodiment.

The method of forming mixed layer 323 on port 528 and valve 525, striking sections 541A and 541C, and striking sections 541D and 541B, is similar to that demonstrated in the third embodiment. The method of crashing the fine particles of MoS$_2$ to the surface, in particular, produces heat energy at the crashing, and the heat energy melts parts of MoS$_2$ into the base material for producing metallic bond, thereby forming mixed layer 323. At the same time, the impact in crashing forms fine recesses in a similar way to what is done in the third embodiment. In this case, the structure of the surface layer becomes martensitic, so that port 528 and valve 525, striking sections 541A and 541C, striking sections 541D and 541B increase their surface strength. In the case of using a leaf spring, of which surface structure is martensitic, as a material of valve 525, the fine recesses can be formed in a similar way.

As discussed above, port 528 and sealing section 525A of valve 525, striking sections 541A and 541C, striking sections 541D and 541B, those are elements of discharging valve device 534A, are provided with mixed layer 323, to which MoS$_2$ is bound. The self-lubricating function of MoS$_2$ lowers the friction coefficient of mutual sealing faces between port 528 and sealing section 525A, the friction coefficients of striking sections 541A and 541C, 541D and 541B, thereby increasing the abrasion resistance. The purity of MoS$_2$ is set at not lower than 98%, and amounts of impurity materials having high friction coefficients are suppressed as much as possible, so that the more effective advantage is obtainable. Formation of fine recesses almost uniformly on the surface of mixed layer 323 allows obtaining a similar advantage to that obtained in the fifth embodiment is obtainable. In this case, a preferable state of the fine recesses is similar to that discussed in the fifth embodiment.

This embodiment, as discussed above, proves that the formation of mixed layer 323 on port 528 and sealing section 525A of valve 525, striking sections 541A and 541C, and striking sections 541D and 541B increases the abrasion resistance of discharging valve device 534A. Further, the formation of fine recesses uniformly on the surface of mixed layer 323 increases the impact resistance of discharging valve device 534A, and improves the performance as well as the efficiency of the compressor. Noises due to discharging valve device 534A can be lowered.

Mixed layer 323 is provided to all of port 528 and sealing section 525A of valve 525, striking sections 541A and 541C, striking sections 541D and 541B; however, it can be provided to either one element of respective combinations.

This embodiment proves that the abrasion resistance, impact resistance, and the strength against fatigue fracture increase in the suction valve device, discharging valve device. The embodiment also proves that the compressing efficiency of the compressor increases, and the noises of the compressor is lowered.

In the fifth and sixth embodiments, a reciprocating compressor having interior oil 103 is described; however, a similar advantage is obtainable with other compressors such as a rotary compressor, scroll compressor, linear compressor. In the case of compressors, which use no oil, such as a linear compressor, an advantage involving no oil is obtainable. For instance, the abrasion resistance, impact resistance, and fatigue-fracture resistance increase because of the improvement in hardness and strength against fatigue fracture.

Exemplary Embodiment 7

Figure 52:
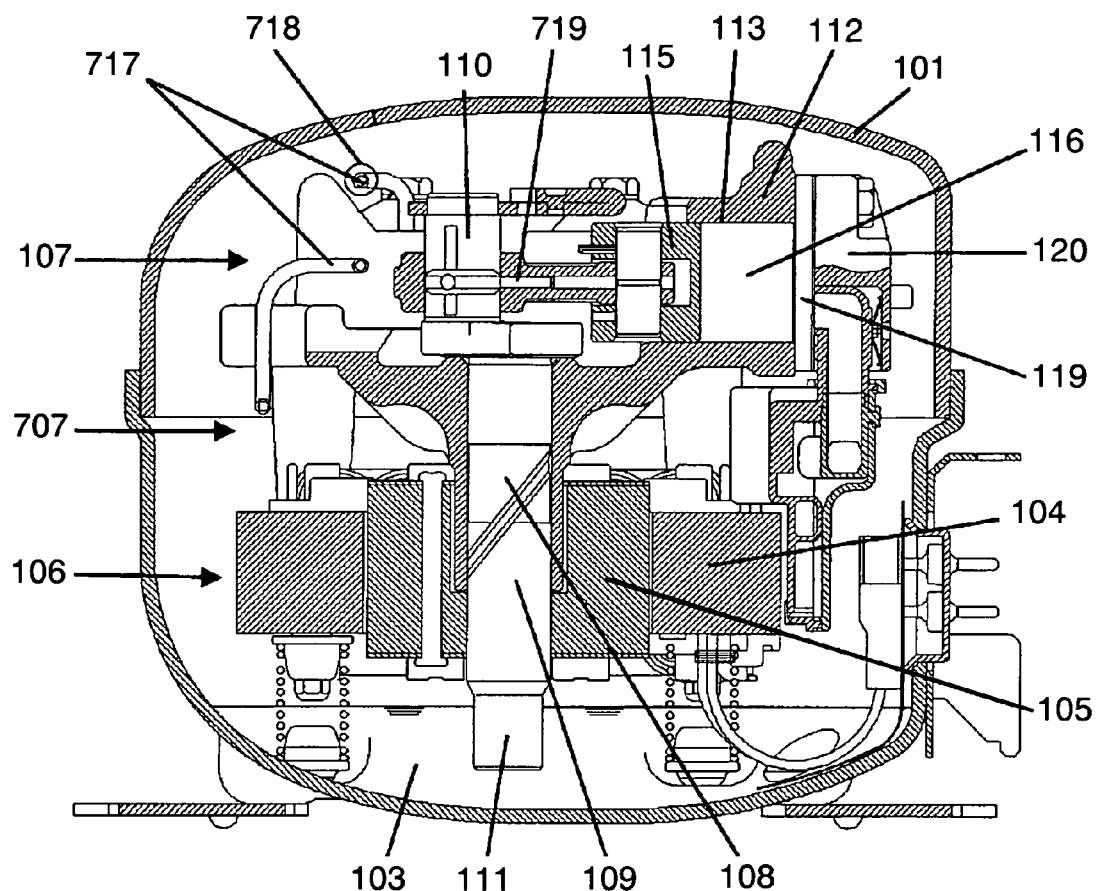
FIG. 52 shows a sectional view of still another compressor in accordance with an exemplary embodiment of the present invention.
Figure 53:
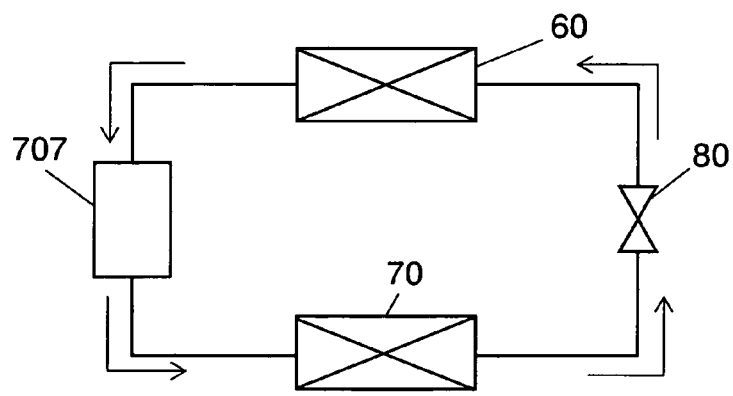
FIG. 53 shows a refrigerating cycle of the refrigerator which includes the compressor shown in FIG. 52.
Figure 54:
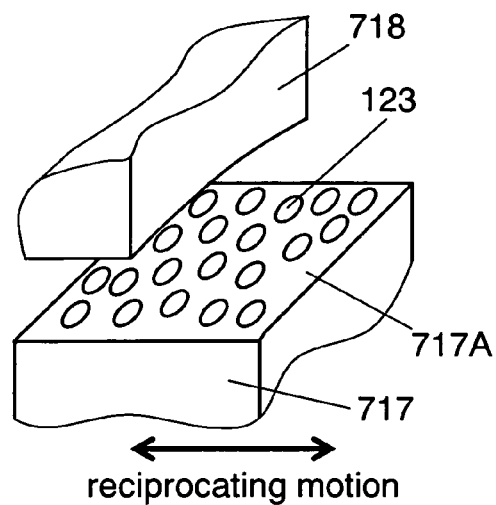
FIG. 54 shows an enlarged view illustrating a portion where the coil spring closely contacts a discharging path in the compressor shown in FIG. 52.

FIG. 52 shows a sectional view of a refrigerant compressor in accordance with a seventh exemplary embodiment of the present invention. FIG. 53 shows a refrigerating cycle of the refrigerator including the compressor shown in FIG. 52. FIG. 54 shows an enlarged view of a contact section between a discharging path and a coil spring of the compressor shown in FIG. 52.

Closed container (container) 101 pools oil 103, accommodates motor section 106 having stator 104 and rotor 105 as well as reciprocating compressor section 107 driven by motor section 106. Discharging path 717 is provided for guiding the compressed refrigerant gas from compressing room 107 to the outside of container 101. Discharging path 717 made from steel pipe is closely surrounded with cohesive coil spring (spring) 718 for preventing abnormal vibration due to resonance. Spring 718 works as a resonance preventive section which can be also made from elastic material such as rubber.

Crankshaft 108 has main shaft 109, to which rotor 105 is press-fitted, and eccentric section 110 eccentric with respect to main shaft 109, and has lubricating pump 111. Cylinder block 112 includes compressing room 116 having typically cylindrical bore 113. Piston 115 reciprocating in bore 113 is coupled to eccentric section 110 via a coupling section, i.e. connecting rod 719. An end face of bore 113 is sealed by valve plate 119.

Head 120 forms a high-pressure room, and discharging path 717 is coupled to heat exchanger 70, i.e. a high pressure side of the refrigerating cycle, via container 101. Discharging path 717 guides the compressed refrigerant gas from head 120 to the outside of container 101.

On the surface of discharging path 717, fine recesses (hereinafter referred to simply as recesses) 123 are formed almost uniformly. Recesses 123 are preferably spherical and have a diameter of 2-20 µm, a depth of 0.2-1.0 µm. Further, the recesses on contact face 717A between spring 718 and discharging path 717 preferably accounts for 40-80% of the surface area of face 717A.

The method of forming recesses 123 is similar to the method discussed in the first embodiment.

The refrigerant gas is hydrocarbon refrigerant including no chlorine, and oil 103 is mutually soluble with this refrigerant.

An operation of the foregoing compressor is demonstrated hereinafter. Rotation of crankshaft 108 accompanies the linear motion of piston 115, thereby changing a volume of compressing room 116. The refrigerant gas (not shown) is thus compressed, and guided to the outside of container 101 via discharging path 717, then the gas arrives at heat exchanger 70, where the gas dissipates its heat to the outside, and returns to heat exchanger 60 via expansion valve 80. The refrigerating machine is thus structured.

The rotation of crankshaft 108 prompts lubricating pump 111 to supply oil 103 to respective sliding sections for lubrication, and then oil 103 is discharged from a tip of eccentric section 110 into container 101. Oil 103 is also discharged to discharging path 717.

Compressor unit 707 always generates micro-vibration while compressor section 107 operates, and at the start or stop of the operation, compressor unit 707 largely wobbles due to inertia force, then discharging path 717 wobbles in every direction, so that spring 718 contacts the steel pipe of discharging path 717 intermittently. As such, they are contact sections scraping against each other caused by driving compressor section 107.

However, in this embodiment, as shown in FIG. 54, recesses 123 are formed almost uniformly on contact face 717A of discharging path 717. The formation of recesses 123 reduces the area between the contact sections, so that metal contacts can be reduced. At the formation of recesses 123, the surface structure of discharging path 717 and spring 718 becomes martensitic, and thus the surface strength increases, so that the abrasion resistance and impact resistance of those surfaces increase. Oil 103 retained in recesses 123 is drawn into the space between discharging path 717 and spring 718 when this space becomes smaller due to the relative motion between the viscosity of oil 103 and the contact sections. Pressure which bears the load occurs in oil 103, thereby forming wedge-shaped oil film, which prevents the metal contacts from happening on contact face 717A, so that abnormal noises can be effectively suppressed.

Spherical recesses 123 will produce a flow of oil 103, as shown in FIG. 3 discussed in the first embodiment, thereby generating oil pressure, which prevents the metal contacts and thus the abnormal noises from happening.

The size of each one of recesses 123 is set as diameter of 20-50 µm, depth of 1-10 µm, so that the volume of each recess 123 is determined small. The volumetric change at the supply of oil 103 including the refrigerant to recesses 123 becomes thus small. As a result, little decrease in the pressure at the space between the contact sections is expected. Foaming phenomenon of the refrigerant dissolving in oil 103 can be observed thus only a little, so that breakage of the oil film due to the foaming of refrigerant happens little, and the function of preventing the metal contacts is kept at a high level. As a result, the abrasion resistance increases, and the function of preventing the abnormal noises is boosted.

If the recesses accounts for 40-80% of the surface area of sliding face 717A, the spherical shape of recess 123 can be maintained. As a result, a slant surface due to recess 123 is provided uniformly between path 717 and spring 718, and a flat area is provided uniformly in parallel with sliding face 717A. In other words, an effect similar to that of a taper-land bearing is obtainable. This structure boosts the dynamic pressure produced in sliding, so that the metal contacts can be further prevented.

When recesses 123 are formed on the surface of the steel pipe, i.e. an element of discharging path 717, steel balls or ceramic balls are crashed to the surface at a speed higher than a given one. The surface structure of pipe 717 thus becomes martensitic, so that the surface hardness increases, and the abrasion resistance increases.

Hydrocarbon refrigerant is used as the refrigerant gas which is highly mutually soluble with oil 103; however the refrigerant dissolving in oil 103 produces foams little as discussed previously. The oil film is thus scarcely broken by the foams, so that the abrasion resistance increases and the abnormal noises can be prevented in addition to suppressing ozonosphere and global warming. Those advantages contribute to the reduction of the number of components and the manufacturing cost of the compressor.

Exemplary Embodiment 8

Figure 55A:
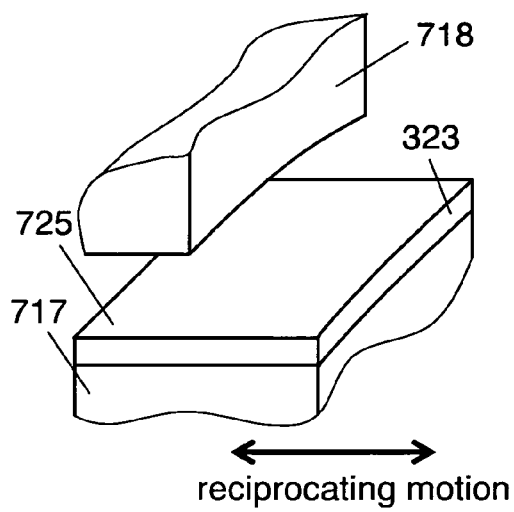
FIGS. 55A and 55B are enlarged views illustrating a portion where the coil spring closely contacts another discharging path in the compressor shown in FIG. 52.
Figure 55B:
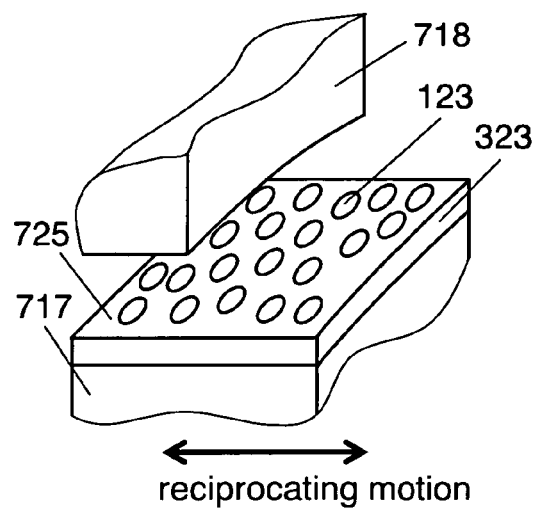

FIGS. 55A and 55B show enlarged views of a contact section between a discharging path and a coil spring of the compressor in accordance with an eighth exemplary embodiment of the present invention. This compressor has a similar structure to that demonstrated in the seventh embodiment using FIG. 52. This compressor has mixed layer 323 including molybdenum disulfide ($MoS_2$) on the surface of a steel pipe which forms discharging pipe 717 as shown in FIG. 55A, while the steel pipe of path 717 in the seventh embodiment has fine recesses 123 formed almost uniformly on its surface. The structures other than this remain unchanged from the compressor of the seventh embodiment.

As shown in FIG. 55B, recesses 123 are preferably formed almost uniformly on mixed layer 323, and each one of recesses 123 is preferably shaped spherically, and has a diameter of 2-20 µm and a depth of 0.2-1.0 µm. The recesses preferably accounts for 40-80% of the surface area of the contact face 717A between spring 718 and discharging path 717.

The methods of forming mixed layer 323 and recesses 123 are similar to those discussed in the third embodiment.

The refrigerant gas is made of hydrocarbon refrigerant, which includes no chlorine and is mutually soluble with oil 103.

Compressor unit 707 always generates micro-vibration while compressor section 107 operates, and at the start or stop of the operation, compressor unit 707 largely wobbles due to inertia force, then discharging path 717 wobbles in every direction, so that spring 718 contacts the steel pipe of discharging path 717 intermittently. As such, they are contact sections scraping against each other caused by driving compressor section 107.

However, in this embodiment, mixed layer 323 including $MoS_2$ is formed on contact surface 717A of discharging path 717. Because the structure of $MoS_2$ forms dense hexagonal system, when solid contacts happen, the $MoS_2$ cleaves at a low friction coefficient, thereby exerting its self-lubricating function. The friction coefficient at the contact sections is thus lowered, and abnormal noises due to metal contacts are effectively suppressed.

The purity of $MoS_2$ is preferably set at not lower than 98%, so that the amounts of impurities having high friction coefficients decrease to little amounts, thereby lowering the friction coefficient and suppressing effectively the abnormal noises caused by metal contacts.

The purity of $MoS_2$ is preferably set at not lower than 98%, so that amounts of impurity materials having high friction coefficients are suppressed as much as possible, thereby further lowering the friction coefficient and suppressing the abnormal noises caused by metal contacts.

As shown in FIG. 55B, the formation of recesses 123 almost uniformly on contact face 725 of mixed layer 323 produces a similar advantage to that discussed in the seventh embodiment.

The preferable state of recesses 123 is similar to that discussed in the seventh embodiment. Balls of $MoS_2$ are crashed to the surface of discharging path 717 made of steel pipe at a speed higher than a given one for producing recesses 123, so that the surface structure of discharging path 717 becomes martensitic, and the surface hardness increases as well as the abrasion resistance increases.

Hydrocarbon refrigerant is used as the refrigerant gas which is highly mutually soluble with oil 103; however the refrigerant dissolving in oil 103 produces foams little as discussed above. The oil film is thus scarcely broken by the foams, so that the abrasion resistance increases and the abnormal noises can be prevented in addition to suppressing ozonosphere and global warming. Those advantages contribute to the reduction of the number of components and the manufacturing cost of the compressor.

In the seventh and eighth embodiments, the compressor is demonstrated as a reciprocating compressor. A rotary compressor or a linear compressor, which has a path for guiding the refrigerant gas from the compressing mechanism to the outside of the container, can obtain a similar advantage to what is discussed above.

Exemplary Embodiment 9

Figure 56:
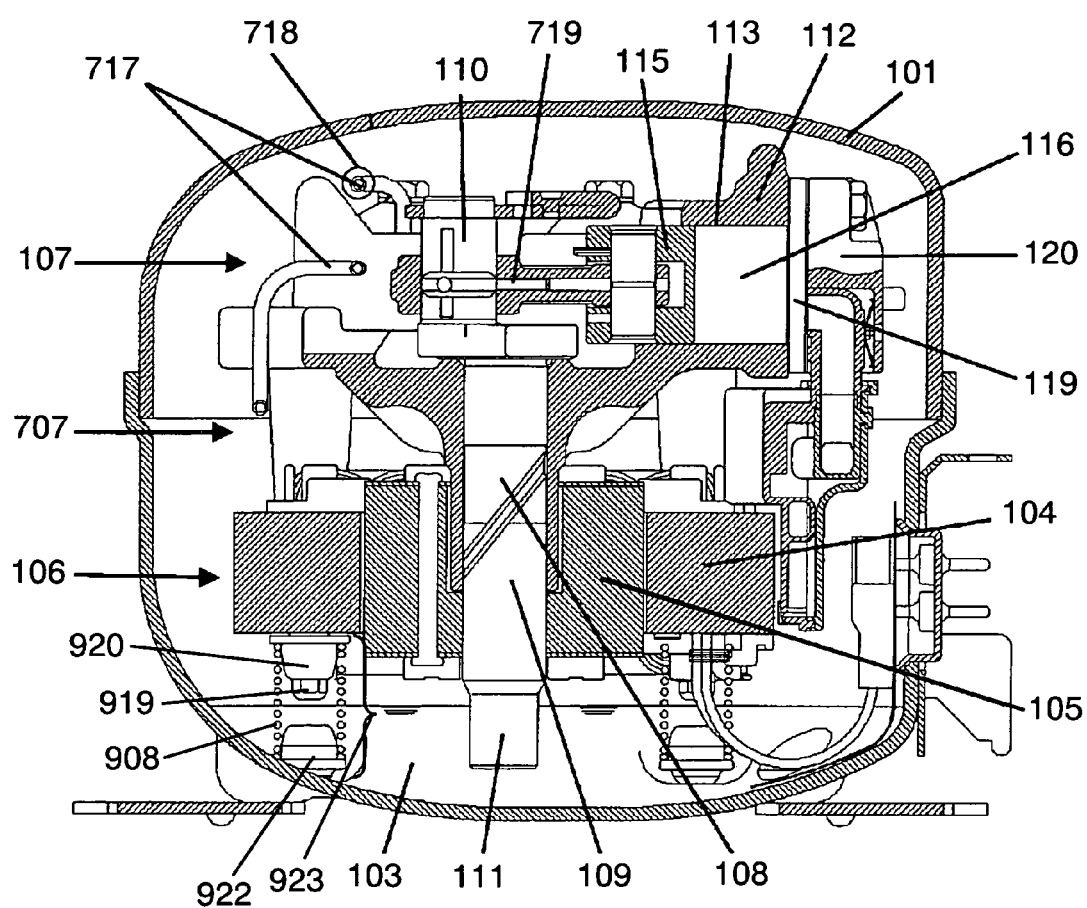
FIG. 56 shows a sectional view of yet still another compressor in accordance with an exemplary embodiment of the present invention.
Figure 57A:
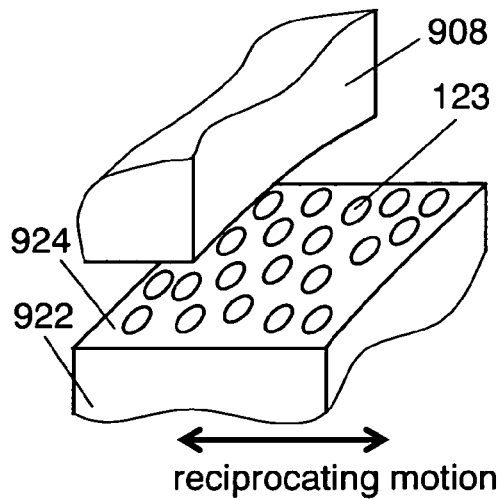
FIGS. 57A, 57B and 57C show enlarged views illustrating a portion where the compression coil spring contacts the holders in the compressor shown in FIG. 56.

A compressor in accordance with the present exemplary embodiment has a similar structure to that demonstrated in the seventh embodiment using FIG. 52. This compressor differs from that one demonstrated in the seventh embodiment in the structure of supporting section 923 which resiliently supports compressor section 107 via stator 104 in closed container(hereinafter referred to simply as "container") 101. FIG. 56 shows a sectional view of the refrigerant compressor in accordance with this exemplary embodiment. FIG. 57A shows an enlarged view illustrating a contact section between compression coil spring 908 and holder 922 in supporting section 923.

Stator fastening bolt 919 for fastening stator 104 of motor section 106 has holder 920 integrally formed therewith at its head. Container 101 has holder 922 fixed to its bottom of the inner wall. Compression coil spring (hereinafter referred to simply as "spring") 908 has its upper end and lower end inserted into holders 920 and 922 respectively. Supporting section 923 is formed of spring 908, holders 920 and 922.

Spring 908, holders 920, 922 are made from iron-based metal material. Fine recesses (hereinafter referred to simply as "recesses") 123 are formed almost uniformly on at least one of the mutual contact faces between spring 908 and holder 920, between spring 908 and holder 922. FIG. 57A shows an example of fine recesses 123 formed on contact face 924 of holder 922.

Recesses 123 are preferably spherical and have a diameter of 2-20 µm, a depth of 0.2-1.0 µm. Further, the recesses preferably accounts for 40-80% of the mutual sealing surface area.

The method of forming recesses 123 on spring 908, holder 920, 922 is similar to the method discussed in the first embodiment.

The refrigerant gas is made of hydrocarbon refrigerant free from chlorine and is mutually soluble with oil 103.

An operation of the compressor structured above is demonstrated hereinafter. Rotation of crankshaft 108 accompanies the linear motion of piston 115, thereby changing a volume of compressing room 116. The refrigerant gas (not shown) is thus compressed, and guided to the outside of container 101 via discharging path 717. The rotation of crankshaft 108 prompts lubricating pump 111 to supply oil 103 to respective sliding sections for lubrication, and then oil 103 is discharged from a tip of eccentric section 110 into container 101.

Compressor unit 707 always generates micro-vibration while compressor section 107 operates, and at the start or stop of the operation, compressor unit 707 largely wobbles due to inertia force, then spring 908 wobbles in every direction, so that spring 908 contacts holders 920, 922 intermittently. As such they are contact sections scraping against each other caused by driving compressor section 107.

However as shown in FIG. 57A, recesses 123 are formed almost uniformly on contact face 924 of holder 922. The formation of recesses 123 reduces the area between the contact sections, so that metal contacts are reduced. At the formation of recesses 123, the surface structure of holder 922 becomes martensitic, and thus the surface strength increases, so that the abrasion resistance and impact resistance of holder 922 increase. In order to work these advantages more explicitly, recesses 123 are preferably formed on every contact faces of spring 908, holders 920, 922.

The formation of recesses 123 on the mutual contact faces such as contact face 924 allows recesses 123 to retain oil 103. Oil 103 is drawn into the spaces between spring 908 and holder 920, between spring 908 and holder 922 when those spaces become smaller, because of the relative motion between the viscosity of oil 103 and the contact sections. Pressure which bears the load thus occurs in oil 103, thereby forming wedge-shaped oil film, which prevents the metal contacts from happening on the mutual contact faces, so that abnormal noises are effectively suppressed.

The spherical shape of recess 123 allows the flow of oil, which generates oil film at the sliding, to produce a vertex flow in recess 123 with ease. This phenomenon is similar to what is discussed in the first embodiment using FIG. 3. Thus an oil pressure is generated, which prevents the metal contact as well as abnormal sound.

The preferable state of recesses 123 is similar to that described in other embodiments, so that it is omitted here. The preferable state includes a size of each one of recesses 123 and a percentage of the recessed area occupying the surface area of the contact sections.

Hydrocarbon refrigerant is used as the refrigerant gas which is highly mutually soluble with oil 103; however the refrigerant dissolving in oil 103 produces foams little as discussed previously. The oil film is thus scarcely broken by the foams. The hydrocarbon refrigerant free from chlorine is used, so that even in the open air, both of the ozonosphere and global warming are suppressed in addition to the advantages such as the increase in abrasion resistance and the prevention of abnormal sound. Those advantages contribute to the reduction of the number of components and the manufacturing cost of the compressor.

Figure 57B:
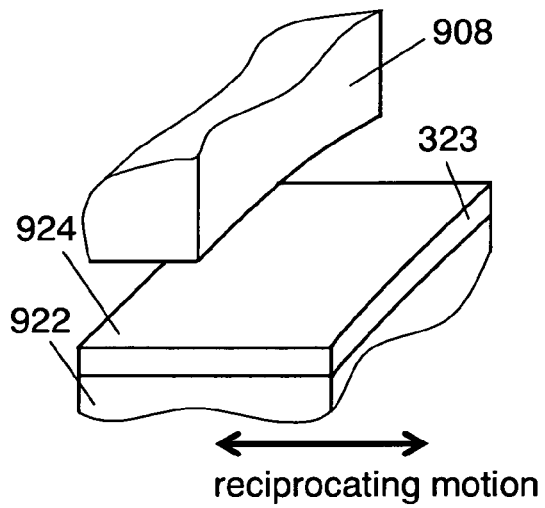

As shown in FIG. 57B, mixed layer 323 to which $MoS_2$ is bound can be formed on the mutual contact faces, such as contact face 924. The method of forming $MoS_2$ on the contact faces is similar to that discussed in the third embodiment. This structure allows the MoS$_2$ to cleave at a low friction coefficient and exerts its solid self-lubrication function even if solid contact happens. The friction coefficient of the contact section thus lowers, and abnormal sound due to metal contact is effectively suppressed. The purity of MoS$_2$ is similar to that described in the third embodiment.

Figure 57C:
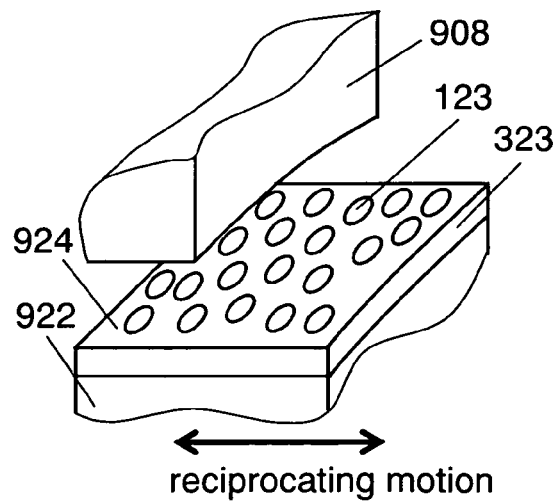
Figure 58:
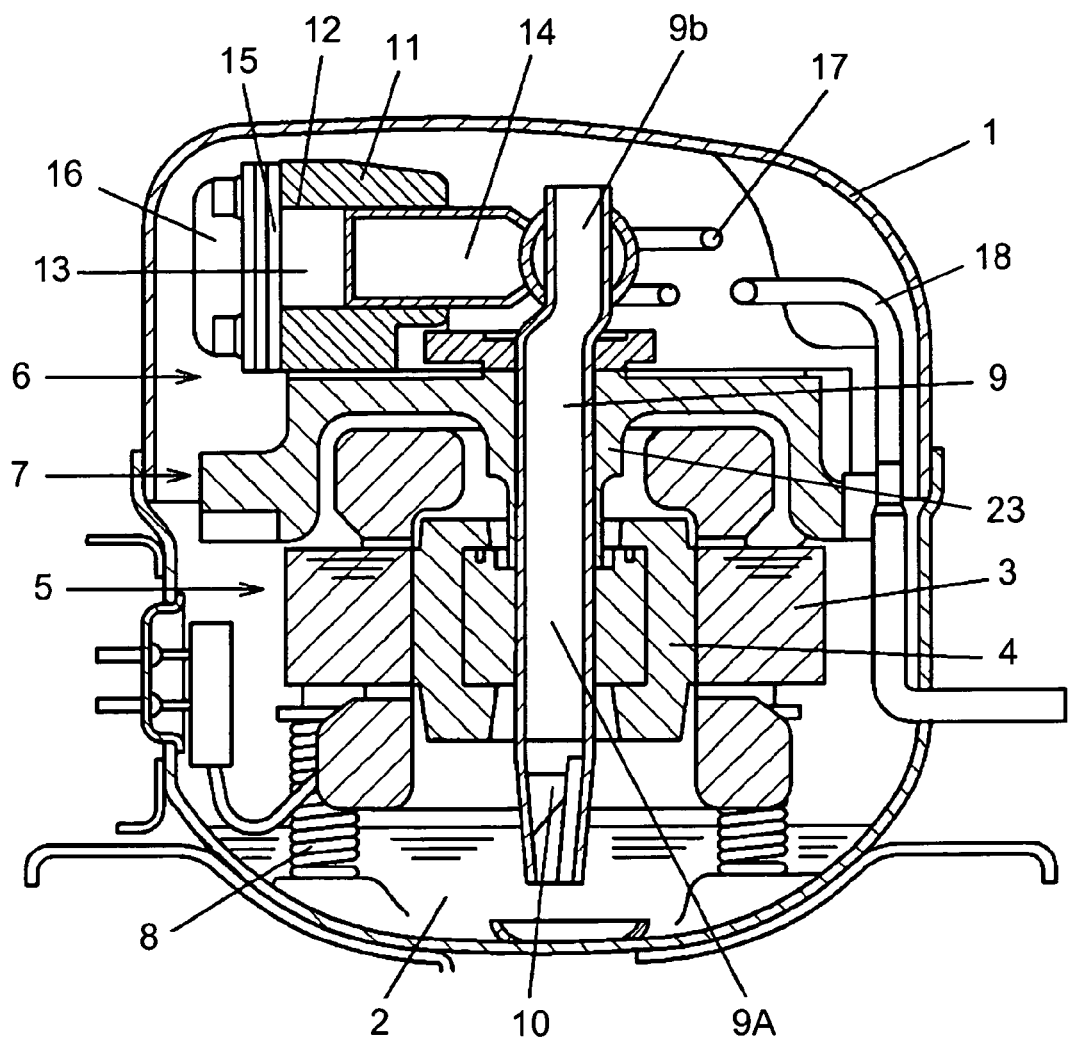
FIG. 58 shows a sectional view of a closed electrical refrigerant compressor developed by the prior art.
Figure 59:
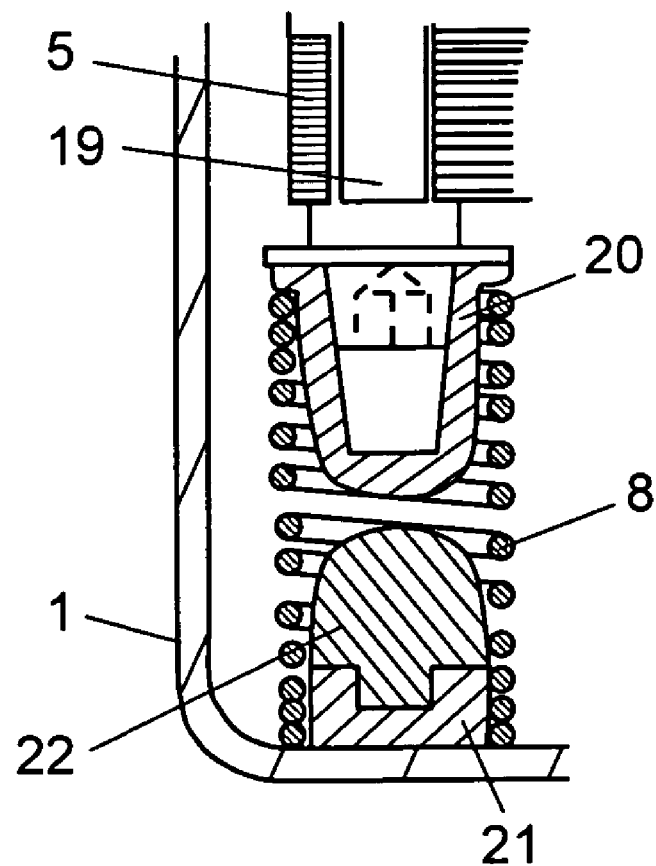
FIG. 59 shows a supporting structure of the compressor shown in FIG. 58.

As shown in FIG. 57C, recesses 123 shown in FIG. 57A can be formed almost uniformly on the surface of mixed layer 323. The method of forming mixed layer 323 and recesses 123 simultaneously is similar to that described in the third embodiment. The preferable state of recesses 123 is described previously. This structure allows exerting the advantages demonstrated using FIGS. 57A and 57B in a compound manner.

In this embodiment, holders 920 and 922, and spring 908 disposed therebetween form supporting section 923, namely, the coil-spring suspension method is employed. Other than this method, the leaf-spring method or the torsion-bar method can be used to form supporting section 923. In those cases, the formation of recesses 123 or mixed layer 323 on a section slid by driving compressor section 107 can produce a similar advantage to that discussed previously.

In this embodiment, a refrigerating machine employing a reciprocating compressor is used; however, any refrigerating machines can obtain a similar advantage as far as they employ an inner suspension method regardless of types or models, such as rotary compressor, scroll compressor, linear compressor, or starling-pump.

INDUSTRIAL APPLICABILITY

The refrigerant compressor of the present invention includes a compressor section, a driver, a first contact section and a second contact section. The compressor section is accommodated in a closed container for compressing the refrigerant gas. The driver drives the compressor section. The first and second contact sections are brought into contact with each other or they slide with each other by driving the compressor section. On the surface of each one of the contact sections, at least one of plural recesses uniformly placed or a mixed layer, to which molybdenum disulfide (MoS$_2$) is bound, is formed. Those contact sections refer to the following elements: sliding sections of a piston and a bore, a valve port and a movable valve of a suction valve or a discharging valve, a steel pipe and a coil spring of a discharging path, holders and a spring forming the supporting section for supporting the compressor section and so on. This structure allows increasing the abrasion resistance of the first and second contact sections, so that a reliable and efficient compressor is obtainable. The refrigerating machine employing such a compressor is also reliable and efficient.

The invention claimed is:

1. A refrigerant compressor comprising:
   a closed container;
   a compressor section, which is accommodated in the closed container, for compressing refrigerant;
   a driver for driving the compressor section; and
   a plurality of contact sections including first contact section and a second contact section to be brought into contact with each other or slid with each other by driving the compressor section,
   wherein at least one of a plurality of spherically shaped recesses is formed on a surface of at least one of the first contact section and the second contact section, and
   wherein the at least one spherically shaped recess is (a) shaped sufficiently for causing a distance between the contact sections to remain constant as the contact sections move with respect to each other and (b) configured for causing oil to form a vortex flow in the one spherically shaped recess and the oil is retained in the at least one recess.

2. The refrigerant compressor of claim 1, wherein the first contact section and the second contact section are sliding components forming the compressor section.

3. The refrigerant compressor of claim 1, wherein the compressor section has a piston and a bore in which the piston is loosely fitted, wherein the first contact section refers to the piston, and the second contact section refers to the bore.

4. The refrigerant compressor of claim 1, wherein the compressor section has a crankshaft including a main shaft and an eccentric section, and a bearing for supporting the main shaft, wherein the first contact section refers to the main shaft, and the second contact section refers to the bearing.

5. The refrigerant compressor of claim 1, wherein the compressor section has:
   a crankshaft including a main shaft and an eccentric section;
   a piston;
   a piston-pin disposed at the piston; and
   a connecting rod for coupling the eccentric section to the piston-pin,
   wherein the first contact section refers to the piston-pin, and the second contact section refers to the connecting rod.

6. The refrigerant compressor of claim 1,
   wherein the driver has a rotor,
   wherein the compressor section has a crankshaft including a main shaft and an eccentric section, and a bearing for supporting the main shaft,
   wherein the refrigerant compressor further comprises a thrust washer disposed between the rotor and the bearing,
   wherein the rotor has a flange face contacting the thrust washer,
   wherein the bearing has a thrust section contacting the thrust washer, and
   wherein the first contact section refers to the thrust washer, and the second contact section refers to at least one of the flange face and the thrust face.

7. The refrigerant compressor of claim 1, wherein the compressor section has:
   a crankshaft including:
   a main shaft;
   an eccentric section;
   a flange section disposed between the main shaft and the eccentric section,
   a bearing, for supporting the main shaft, including a thrust section contacting the flange section,
   wherein the first contact section refers to the flange section, and the second contact section refers to the thrust section.

8. The refrigerant compressor of claim 1, wherein the compressor section has:
   a compressing room;
   a rolling piston for rolling in the compressing room; and
   a vane for being pushed by the rolling piston to partition the compressing room,
   wherein the first contact section refers to the rolling piston, and the second contact section refers to the vane.

9. The refrigerant compressor of claim 1, wherein the compressor section has:
   a shaft including a main shaft, a sub-shaft, and an eccentric section;

a rolling piston loosely fitted in the eccentric section;
a main bearing for supporting the main shaft; and
a sub-bearing for supporting the sub-shaft,
wherein a combination of the first contact section and the second contact section refers to at least one of a combination of the eccentric section and the rolling piston, a combination of the main shaft and the main bearing, and a combination of the sub-shaft and the sub-bearing.

10. The refrigerant compressor of claim 1, wherein the compressor section has at least one of:
a suction valve device including a suction valve port and a suction movable valve, wherein the suction movable valve opens during a sucking operation; and
a discharging valve device including a discharging valve port and a discharging movable valve, wherein the discharging movable valve opens during a discharging operation,
wherein a combination of the first contact section and the second contact section refers to at least one of a combination of the suction valve port and the suction movable valve, and a combination of the discharging valve port and the discharging movable valve.

11. The refrigerant compressor of claim 10, wherein at least one of the suction movable valve and the discharging movable valve is formed of a leaf spring having martensitic surface structure.

12. The refrigerant compressor of claim 10, wherein at least one of the suction movable valve and the discharging movable valve has an arm of which at least one of faces has recesses formed uniformly.

13. The refrigerant compressor of claim 10,
wherein the discharging movable valve has a first striking section,
wherein the discharging valve device further has a stopper, for regulating a motion of the discharging movable valve, and which stopper has a second striking section which is brought into contact with the first striking section by an opening operation of the discharging movable valve,
wherein the first contact section refers to the first striking section, and the second contact section refers to the second striking section.

14. The refrigerant compressor of claim 13, wherein the discharging valve device further has a backup lead disposed between the stopper and the discharging movable valve, the backup lead having a third striking section and a fourth striking section,
wherein a combination of the first contact section and the second contact section refers to at least one of a combination of the first striking section and the third striking section, and a combination of the second striking section and the fourth striking section.

15. The refrigerant compressor of claim 1 further comprising a discharging path for guiding the compressed refrigerant from the compressor section to outside of the closed container; and a resonance preventive section which covers the discharging path,
wherein the first contact section refers to the discharging path, and the second contact section refers to the resonance preventive section.

16. The refrigerant compressor of claim 1 further comprising a supporting section, for resiliently supporting the compressor section in the closed container, which supporting section has the first contact section and the second contact section.

17. The refrigerant compressor of claim 16, wherein the supporting section has:
a first holder for holding the compressor section;
a second holder disposed on an inner wall of the closed container; and
a spring disposed between the first holder and the second holder;
wherein the first contact section refers to the spring, and the second contact section refers to at least one of the first holder and the second holder.

18. The refrigerant compressor of claim 1 further comprising oil which remaining one of in the recesses and on a surface of the mixed layer.

19. The refrigerant compressor of claim 18, wherein the recesses have spherical surfaces.

20. The refrigerant compressor of claim 18, wherein the recesses have a diameter of at least 2 μm and at most 50 μm, and a depth of at least 0.5 μm and at most 10 μm.

21. The refrigerant compressor of claim 18, wherein an area occupied by the recesses accounts for at least 40% and at most 80% of a surface area of at least one of the first contact section and the second contact section on which the recesses are formed.

22. The refrigerant compressor of claim 18, wherein a viscosity of the oil is at least VG5 and less than VG10.

23. The refrigerant compressor of claim 18, wherein the refrigerant is made from hydrocarbon free from chlorine and the oil is mutually soluble with the refrigerant.

24. The refrigerant compressor of claim 18, wherein the refrigerant includes at least one of isobutane and propane, and wherein the oil includes at least one of alkylbenzene, mineral oil, ester, polyvinylether and polyalkyleneglycol.

25. The refrigerant compressor of claim 1, wherein the first contact section and the second contact section are made of iron-based base material, and a surface structure of at least one of the first contact section and the second contact section is martensitic.

26. The refrigerant compressor of claim 1, wherein a purity of the molybdenum disulfide of the mixed layer is at least 98%.

27. The refrigerant compressor of claim 1, wherein the recesses is formed on surfaces of the mixed layer.

28. The refrigerant compressor of claim 1, wherein the plurality of recesses are spaced from each other sufficiently for forming oil uniformly between the contact sections.

* * * * *